US011941857B2

(12) United States Patent
Dehghani et al.

(10) Patent No.: US 11,941,857 B2
(45) Date of Patent: Mar. 26, 2024

(54) SYSTEMS AND METHODS FOR DATA REPRESENTATION IN AN OPTICAL MEASUREMENT SYSTEM

(71) Applicant: HI LLC, Los Angeles, CA (US)

(72) Inventors: Hamid Dehghani, Birmingham (GB); Ryan Field, Culver City, CA (US); Julian Kates-Harbeck, Marina Del Rey, CA (US); Viktoria Rojkova, Los Angeles, CA (US); Ashutosh Chaturvedi, Playa Vista, CA (US)

(73) Assignee: HI LLC, Los Angeles, CA (US)

( * ) Notice: Subject to any disclaimer, the term of this patent is extended or adjusted under 35 U.S.C. 154(b) by 401 days.

(21) Appl. No.: 17/324,819

(22) Filed: May 19, 2021

(65) Prior Publication Data
US 2021/0374458 A1    Dec. 2, 2021

Related U.S. Application Data

(60) Provisional application No. 63/152,529, filed on Feb. 23, 2021, provisional application No. 63/030,199, filed on May 26, 2020.

(51) Int. Cl.
G06V 10/14 (2022.01)
G02B 27/01 (2006.01)
(Continued)

(52) U.S. Cl.
CPC ....... G06V 10/141 (2022.01); G02B 27/0172 (2013.01); G06F 18/10 (2023.01);
(Continued)

(58) Field of Classification Search
CPC ...... G06V 10/141; G06V 10/14; G06V 10/76; G06V 10/147; G06V 10/507;
(Continued)

(56) References Cited

U.S. PATENT DOCUMENTS 5,386,827 A * 2/1995 Chance ............. A61B 5/14553
600/473
5,413,098 A * 5/1995 Benaron ............ A61B 5/1464
250/343

(Continued)

FOREIGN PATENT DOCUMENTS

WO    2018033751    2/2018

OTHER PUBLICATIONS

Vornicu et al., "Compact Real-Time Inter-Frame Histogram Builder for 15-Bits High-Speed ToF-Imagers Based on Single-Photon Detection" (pp. 2181-2190) (Year: 2019).*

(Continued)

Primary Examiner — Manav Seth
(74) Attorney, Agent, or Firm — ALG Intellectual Property, LLC

(57) ABSTRACT

An illustrative method includes accessing, by a computing device, a model simulating light scattered by a simulated target, the model comprising a plurality of parameters. The method further includes generating, by the computing device, a set of possible histogram data using the model with a plurality of values for the parameters. The method further includes determining, by the computing device, a set of components that represent the set of possible histogram data, the set of components having a reduced dimensionality from the set of possible histogram data.

15 Claims, 25 Drawing Sheets

(51) Int. Cl.
*G06F 18/10* (2023.01)
*G06F 18/2132* (2023.01)
*G06F 18/2135* (2023.01)
*G06V 10/141* (2022.01)
*G06V 10/147* (2022.01)
*G06V 10/50* (2022.01)
*G06V 10/75* (2022.01)

(52) U.S. Cl.
CPC ...... *G06F 18/2132* (2023.01); *G06F 18/2135* (2023.01); *G06V 10/14* (2022.01); *G06V 10/147* (2022.01); *G06V 10/507* (2022.01); *G06V 10/76* (2022.01); *G02B 2027/014* (2013.01)

(58) Field of Classification Search
CPC .. G06F 18/2132; G06F 18/10; G06F 18/2135; G02B 27/0172; G02B 2027/014
See application file for complete search history.

(56) References Cited

U.S. PATENT DOCUMENTS

| | | | |
|---|---|---|---|
| 5,853,370 A * | 12/1998 | Chance | A61B 5/0042 600/431 |
| 6,240,309 B1 | 5/2001 | Yamashita et al. | |
| 6,384,663 B2 | 5/2002 | Cova et al. | |
| 6,640,133 B2 | 10/2003 | Yamashita | |
| 6,683,294 B1 | 1/2004 | Herbert et al. | |
| 7,356,365 B2 | 4/2008 | Schurman | |
| 7,547,872 B2 | 6/2009 | Niclass et al. | |
| 7,599,059 B2 * | 10/2009 | Laurence | G01N 21/6458 356/317 |
| 7,774,047 B2 | 8/2010 | Yamashita et al. | |
| 8,026,471 B2 | 9/2011 | Itzler | |
| 8,078,250 B2 | 12/2011 | Chen et al. | |
| 8,082,015 B2 * | 12/2011 | Yodh | A61B 5/14553 600/407 |
| 8,150,636 B2 * | 4/2012 | Labarbe | G01N 21/6408 702/22 |
| 8,269,964 B2 * | 9/2012 | Heanue | G01N 21/6456 356/336 |
| 8,633,431 B2 | 1/2014 | Kim | |
| 8,817,257 B2 | 8/2014 | Herve | |
| 8,947,659 B1 * | 2/2015 | Baastians | G01N 21/65 356/301 |
| 9,058,081 B2 | 6/2015 | Baxter | |
| 9,076,707 B2 | 7/2015 | Harmon | |
| 9,131,861 B2 | 9/2015 | Ince et al. | |
| 9,316,735 B2 | 4/2016 | Baxter | |
| 9,401,448 B2 | 7/2016 | Bienfang et al. | |
| 9,419,635 B2 | 8/2016 | Kumar et al. | |
| 9,442,201 B2 | 9/2016 | Schmand et al. | |
| 9,529,079 B1 | 12/2016 | Droz | |
| 9,574,936 B2 | 2/2017 | Heinonen | |
| 9,946,344 B2 * | 4/2018 | Ayaz | A61B 5/14553 |
| D817,553 S | 5/2018 | Aaskov et al. | |
| D825,112 S | 8/2018 | Saez | |
| 10,158,038 B1 | 12/2018 | Do Valle et al. | |
| 10,340,408 B1 * | 7/2019 | Katnani | H01L 31/022408 |
| 10,424,683 B1 | 9/2019 | Do Valle | |
| 10,515,993 B2 * | 12/2019 | Field | H01L 27/14629 |
| 10,583,293 B2 * | 3/2020 | Chaturvedi | G16H 20/30 |
| 10,641,876 B2 * | 5/2020 | Field | G01S 17/10 |
| 10,697,829 B2 * | 6/2020 | Delic | G01J 1/44 |
| 10,739,445 B2 * | 8/2020 | Hollmann | G01S 7/4816 |
| 10,752,158 B2 * | 8/2020 | Satat | B60Q 1/0023 |
| 10,772,561 B2 * | 9/2020 | Donaldson | A61B 5/6803 |
| 10,809,796 B2 | 10/2020 | Armstrong-Muntner | |
| 10,847,563 B2 * | 11/2020 | Field | G01S 7/4861 |
| 10,912,504 B2 | 2/2021 | Nakaji | |
| 11,006,876 B2 * | 5/2021 | Johnson | A61B 5/742 |
| 11,006,878 B2 | 5/2021 | Johnson | |
| 11,029,397 B2 * | 6/2021 | Bulteel | G01S 17/10 |
| 11,096,620 B1 | 8/2021 | Seidman | |
| 11,609,328 B2 * | 3/2023 | Satat | G01S 17/89 |
| 11,786,694 B2 * | 10/2023 | Poltorak | A61B 5/4812 600/28 |
| 2007/0083097 A1 | 4/2007 | Fujiwara | |
| 2009/0012402 A1 | 1/2009 | Mintz | |
| 2011/0208675 A1 | 8/2011 | Shoureshi et al. | |
| 2012/0323109 A1 * | 12/2012 | Heanue | A61B 5/0086 600/407 |
| 2013/0342835 A1 | 12/2013 | Blacksberg | |
| 2014/0191115 A1 | 7/2014 | Webster et al. | |
| 2014/0217264 A1 | 8/2014 | Shepard | |
| 2014/0275891 A1 | 9/2014 | Muehlemann et al. | |
| 2015/0038811 A1 | 2/2015 | Asaka | |
| 2015/0041625 A1 | 2/2015 | Dutton | |
| 2015/0054111 A1 | 2/2015 | Niclass et al. | |
| 2015/0077279 A1 | 3/2015 | Song | |
| 2015/0150505 A1 | 6/2015 | Kaskoun et al. | |
| 2015/0327777 A1 | 11/2015 | Kostic et al. | |
| 2015/0364635 A1 | 12/2015 | Bodlovic et al. | |
| 2017/0030769 A1 | 2/2017 | Clemens et al. | |
| 2017/0052065 A1 | 2/2017 | Sharma et al. | |
| 2017/0176596 A1 | 6/2017 | Shpunt et al. | |
| 2017/0179173 A1 | 6/2017 | Mandai et al. | |
| 2017/0202518 A1 | 7/2017 | Furman et al. | |
| 2017/0281086 A1 | 10/2017 | Donaldson | |
| 2017/0363467 A1 | 12/2017 | Clemens et al. | |
| 2017/0367650 A1 | 12/2017 | Wallois | |
| 2018/0014741 A1 | 1/2018 | Chou | |
| 2018/0027196 A1 | 1/2018 | Yang et al. | |
| 2018/0039053 A1 | 2/2018 | Kremer et al. | |
| 2018/0070830 A1 | 3/2018 | Sutin et al. | |
| 2018/0070831 A1 | 3/2018 | Sutin et al. | |
| 2018/0089848 A1 | 3/2018 | Yang et al. | |
| 2019/0113385 A1 | 4/2019 | Fukuchi | |
| 2019/0175068 A1 | 6/2019 | Everdell | |
| 2019/0355861 A1 | 11/2019 | Katnani | |
| 2019/0363210 A1 | 11/2019 | Do Valle | |
| 2019/0388018 A1 | 12/2019 | Horstmeyer | |
| 2020/0060542 A1 | 2/2020 | Alford | |
| 2020/0116838 A1 | 4/2020 | Erdogan | |
| 2020/0196932 A1 | 6/2020 | Johnson | |
| 2020/0253479 A1 | 8/2020 | Nurmikko | |
| 2020/0315510 A1 | 10/2020 | Johnson | |
| 2020/0337624 A1 | 10/2020 | Johnson | |
| 2020/0352445 A1 * | 11/2020 | Field | A61B 5/0042 |
| 2020/0371240 A1 * | 11/2020 | Newman | G01S 7/4863 |
| 2020/0390358 A1 | 12/2020 | Johnson | |
| 2021/0181316 A1 * | 6/2021 | Zhu | G01S 17/894 |
| 2021/0290171 A1 * | 9/2021 | Katnani | A61B 5/0082 |
| 2021/0330266 A1 * | 10/2021 | Rojkova | A61B 5/6803 |

OTHER PUBLICATIONS

Alayed, et al., "Characterization of a Time-Resolved Diffuse Optical Spectroscopy Prototype Using Low-Cost, Compact Single Photon Avalanche Detectors for Tissue Optics Applications", Sensors 2018, 18, 3680; doi:10.3390/s18113680, Oct. 29, 2018.

Ban, et al., "Kernel Flow: a high channel count scalable TD-fNIRS system", https://www.spiedigitallibrary.org/conference-proceedings-of-spie Proc. of SPIE vol. 11663, 116630B CCC code: 1605-7422/21/$21 doi: 10.1117/12.2582888, Mar. 5, 2021.

Contini, et al., "Photon migration through a turbid slab described by a model based on diffusion approximation. I. Theory", Appl. Opt. 36(19), 4587 (1997).

Di Sieno, et al., "Probe-hosted large area silicon photomultiplier and high-throughput timing electronics for enhanced performance time-domain functional near-infrared spectroscopy", Biomed. Opt. Express 11(11), 6389 (2020).

Fishburn, et al., "Temporal Derivative Distribution Repair (TDDR): A motion correction method for fNIRS", Neuroimage. Jan. 1, 2019; 184: 171-179. doi:10.1016/j.neuroimage.2018.09.025.

Huppert, et al., "HomER: a review of time-series analysis methods for near-infrared spectroscopy of the brain", Appl. Opt. 48(10), D280 (2009).

(56) References Cited

OTHER PUBLICATIONS

Kienle, et al., "Improved solutions of the steady-state and the time-resolved diffusion equations for reflectance from a semi-infinite turbid medium", J. Opt. Soc. Am. A 14(1), 246 (1997).
Konugolu, et al., "Broadband (600-1350 nm) Time-Resolved Diffuse Optical Spectrometer for Clinical Use", IEEE Journal of Selected Topics in Quantum Electronics, vol. 22, No. 3, May/Jun. 2016.
Lacerenza, et al., "Wearable and wireless time-domain near-infrared spectroscopy system for brain and muscle hemodynamic monitoring", Biomed. Opt. Express 11(10), 5934 (2020).
Lange, et al., "Clinical Brain Monitoring with Time Domain Nirs: A Review and Future Perspectives", Applied Sciences 9(8), 1612 (2019).
Lange, et al., "Maestros: A Multiwavelength Time-Domain NIRS System to Monitor Changes in Oxygenation and Oxidation State of Cytochrome-C-Oxidase", IEEE J. Select. Topics Quantum Electron. 25(1), 1-12 (2019).
Martelli, et al., "Optimal estimation reconstruction of the optical properties of a two-layered tissue phantom from time-resolved single-distance measurements", Journal of Biomedical Optics 20(11), 115001 (Nov. 2015).
Mora, et al., "Fast silicon photomultiplier improves signal harvesting and reduces complexity in time-domain diffuse optics", Opt. Express 23(11), 13937 (2015).
Pifferi, et al., "Performance assessment of photon migration instruments: the MEDPHOT protocol", Applied Optics, 44(11), 2104-2114 (2005).
Prahl, et al., "Optical Absorption of Hemoglobin", http://omlc.ogi.edu/spectra/hemoglobin/index.html. (as accessed Aug. 18, 2021).
Zucchelli, et al., "Method for the discrimination of superficial and deep absorption variations by time domain fNIRS", 2013 OSA Dec. 1, 2013 | vol. 4, No. 12 | DOI:10.1364/BOE.4.002893 | Biomedical Optics Express 2893.
Renna, et al., "Eight-Wavelength, Dual Detection Channel Instrument for Near-Infrared Time-Resolved Diffuse Optical Spectroscopy", IEEE J. Select. Topics Quantum Electron. 25(1), 1-11 (2019).
Torricelli, et al., "Time domain functional NIRS imaging for human brain mapping", NeuroImage 85, 28-50 (2014).
Wabnitz, et al., "Depth-selective data analysis for time-domain fNIRS: moments vs. time windows", Biomed. Opt. Express 11(8), 4224 (2020).
Wabnitz, et al., "Performance assessment of time-domain optical brain imagers, part 1: basic instrumental performance protocol", Journal of Biomedical Optics 19(8), 086010 (Aug. 2014).
Wabnitz, et al., "Performance assessment of time-domain optical brain imagers, part 2: nEUROPt protocol", Journal of Biomedical Optics 19(8), 086012 (Aug. 2014).
Wojtkiewicz, et al., "Self-calibrating time-resolved near infrared spectroscopy", Biomed. Opt. Express 10(5), 2657 (2019).
Alayed, et al., "Characterization of a Time-Resolved Diffuse Optical Spectroscopy Prototype Using Low-Cost, Compact Single Photon Avalanche Detectors for Tissue Optics Applications", Sensors 2018, 18, 3680; doi:10.3390/s18113680.
Ban, et al., "Kernel Flow: a high channel count scalable TD-fNIRS system", https://www.spiedigitallibrary.org/conference-proceedings-of-spie Proc. of SPIE vol. 11663, 116630B CCC code: 1605-7422/21/$21 doi: 10.1117/12.2582888.
Pifferi, et al., "Performance assessment of photon migration instruments: the MEDPHOT protocol", Applied Optics, 44(11), 2104-2114.
Torricelli, et al., "Time domain functional NIRS imaging for human brain mapping", NeuroImage 85, 28-50 (2014).

\* cited by examiner

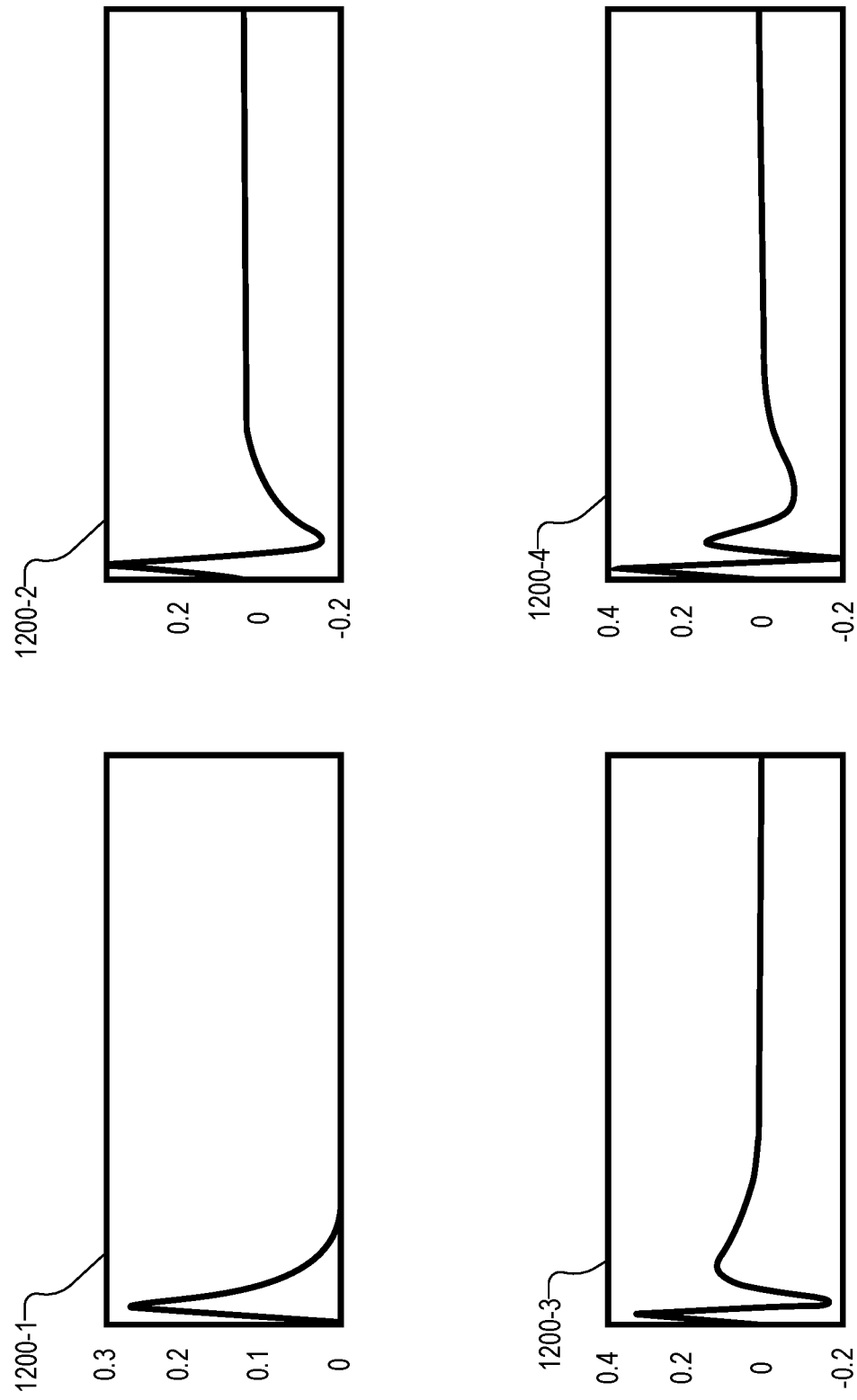

SYSTEMS AND METHODS FOR DATA REPRESENTATION IN AN OPTICAL MEASUREMENT SYSTEM

RELATED APPLICATIONS

The present application claims priority under 35 U.S.C. § 119(e) to U.S. Provisional Patent Application No. 63/152,529, filed on Feb. 23, 2021, and to U.S. Provisional Patent Application No. 63/030,199, filed on May 26, 2020. These applications are incorporated herein by reference in their respective entireties.

BACKGROUND INFORMATION

Detecting neural activity in the brain (or any other turbid medium) is useful for medical diagnostics, imaging, neuroengineering, brain-computer interfacing, and a variety of other diagnostic and consumer-related applications. For example, it may be desirable to detect neural activity in the brain of a user to determine if a particular region of the brain has been impacted by reduced blood irrigation, a hemorrhage, or any other type of damage. As another example, it may be desirable to detect neural activity in the brain of a user and computationally decode the detected neural activity into commands that can be used to control various types of consumer electronics (e.g., by controlling a cursor on a computer screen, changing channels on a television, turning lights on, etc.).

Neural activity and other attributes of the brain may be determined or inferred by measuring responses of tissue within the brain to light pulses. One technique to measure such responses is time-correlated single-photon counting (TCSPC). Time-correlated single-photon counting detects single photons and measures a time of arrival of the photons with respect to a reference signal (e.g., a light source). By repeating the light pulses, TCSPC may accumulate a sufficient number of photon events to statistically determine a histogram representing the distribution of detected photons. Based on the histogram of photon distribution, the response of tissue to light pulses may be determined in order to study the detected neural activity and/or other attributes of the brain.

However, the histograms may include many data points for many points of time. Such large amounts of data may expend large amounts of resources for storing, transmitting, and/or processing. Compressing such data may result in a loss in information.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 12A-12D show exemplary components for representing histogram data.

DETAILED DESCRIPTION

Figure 1:
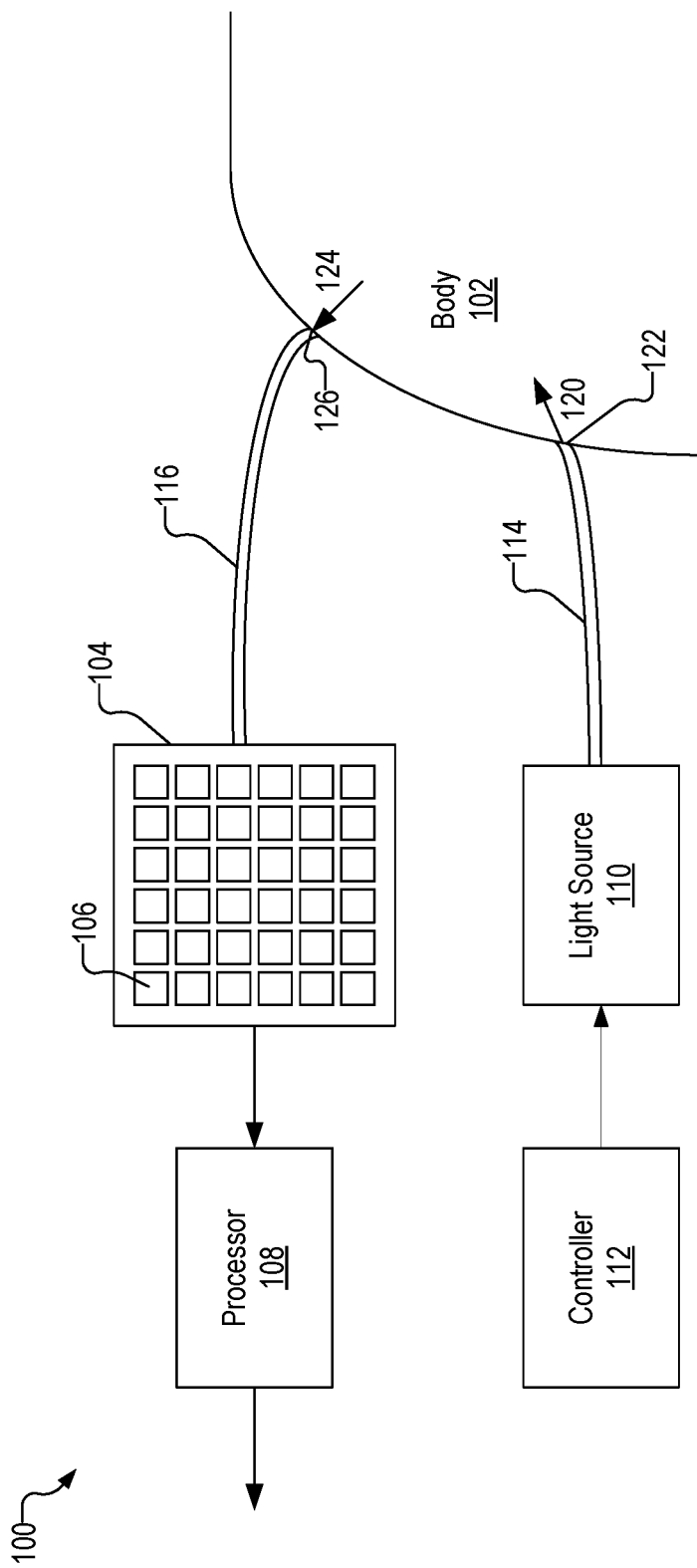
FIG. 1 shows an exemplary optical measurement system.

In accordance with the systems and methods described herein, a method may include accessing a model simulating light scattered by a simulated target, the model comprising a plurality of parameters. The method may further include generating a set of possible histogram data using the model with a plurality of values for the parameters and determining a set of components that represent the set of possible histogram data, the set of components having a reduced dimensionality from the set of possible histogram data. In some examples, the method may further include generating, based on arrival times of photons at a detector after the photons are scattered by a physical target, actual histogram data associated with the physical target. The method may further include generating, based on the set of components, a compressed representation of the actual histogram data.

For example, a computing system as described herein may access a model to generate simulated histogram data. The simulated histogram data may include a set of possible histogram data that would be expected to be generated by an optical measurement system generating actual histogram data associated with a physical target. The computing system may determine, based on the simulated histogram data, a set of components (e.g., eigenvectors) that may represent the histograms of the simulated histogram data (e.g., each as a particular linear combination of the eigenvectors) with a reduced dimensionality. The computing system may provide the eigenvectors to the optical measurement system, so that the optical measurement system may represent actual histogram data using the eigenvectors. In this manner, the optical measurement system may compress the actual histogram data so that storing, transmitting, and/or performing any other suitable operations on the histogram data may use fewer resources (e.g., memory, bandwidth, processing capabilities and/or power, storage space, etc.) than performing such operations using the full-dimensionality data.

Further, as the eigenvectors are determined based on a set of possible histograms rather than a set of historical actual histograms, the eigenvectors may be better suited to represent actual histograms generated that are different from any of the historical actual histograms. As a result, the optical measurement system may compress the actual histogram data with a minimal loss in information, allowing the optical measurement system or any other computing device to reconstruct the actual histogram data more accurately than conventional systems. Conventional systems may compress histogram data naively, such as by taking averages and/or discarding particular portions of the data, and/or require a priori knowledge of the histogram data to know how to best compress the data. For example, conventional algorithms may include curve fitting where full temporal information in the data is used to provide estimates for optical absorption/scattering properties, or a simplification of the data to moments such as total intensity (area under curve) meantime, variance, which are then used as representations of the data. In contrast, systems and methods described herein allow systems to compress data losing minimal information without an a priori knowledge of the actual histograms.

Further, in some examples, as the set of components is determined based on simulated histogram data, compressing actual histogram data using such a set of components may result in a filtering of noise from the actual histogram data. Filtering such noise from the actual histogram data may result in more accurate and useful metrics and predictions (e.g., of mental states of a user) based on the actual histogram data.

Mental states described herein refer to the measured neural activity related to physiological brain states and/or mental brain states, e.g., joy, excitement, relaxation, surprise, fear, stress, anxiety, sadness, anger, disgust, contempt, contentment, calmness, focus, attention, approval, creativity, positive or negative reflections/attitude on experiences or the use of objects, etc. Further details on the methods and systems related to a predicted brain state, behavior, preferences, or attitude of the user, and the creation, training, and use of neuromes can be found in U.S. Provisional Patent Application No. 63/047,991, filed Jul. 3, 2020. Exemplary measurement systems and methods using biofeedback for awareness and modulation of mental state are described in more detail in U.S. patent application Ser. No. 16/364,338, filed Mar. 26, 2019, published as US2020/0196932A1; and U.S. patent application Ser. No. 17/177,975, filed Feb. 17, 2021. Exemplary measurement systems and methods used for detecting and modulating the mental state of a user using entertainment selections, e.g., music, film/video, are described in more detail in U.S. patent application Ser. No. 16/835,972, filed Mar. 31, 2020, published as US2020/0315510A1; and U.S. patent application Ser. No. 17/178,473, filed Feb. 18, 2021. Exemplary measurement systems and methods used for detecting and modulating the mental state of a user using product formulation from, e.g., beverages, food, selective food/drink ingredients, fragrances, and assessment based on product-elicited brain state measurements are described in more detail in U.S. patent application Ser. No. 16/853,614, filed Apr. 20, 2020, published as US2020/0337624A1. Exemplary measurement systems and methods used for detecting and modulating the mental state of a user through awareness of priming effects are described in more detail in U.S. patent application Ser. No. 16/885,596, filed May 28, 2020, published as US2020/0390358A1. These applications and corresponding U.S. publications are incorporated herein by reference in their entirety.

These and other advantages and benefits of the present systems and methods are described more fully herein.

FIG. 1 shows an exemplary optical measurement system 100 configured to perform an optical measurement operation with respect to a body 102. Optical measurement system 100 may, in some examples, be portable and/or wearable by a user. Optical measurement systems that may be used in connection with the embodiments described herein are described more fully in U.S. patent application Ser. No. 17/176,315, filed Feb. 16, 2021; U.S. patent application Ser. No. 17/176,309, filed Feb. 16, 2021; U.S. patent application Ser. No. 17/176,460, filed Feb. 16, 2021; U.S. patent application Ser. No. 17/176,470, filed Feb. 16, 2021; U.S. patent application Ser. No. 17/176,487, filed Feb. 16, 2021; U.S. patent application Ser. No. 17/176,539, filed Feb. 16, 2021; U.S. patent application Ser. No. 17/176,560, filed Feb. 16, 2021; and U.S. patent application Ser. No. 17/176,466, filed Feb. 16, 2021, which applications are incorporated herein by reference in their entirety.

In some examples, optical measurement operations performed by optical measurement system 100 are associated with a time domain-based optical measurement technique. Example time domain-based optical measurement techniques include, but are not limited to, time-correlated single-photon counting (TCSPC), time domain near infrared spectroscopy (TD-NIRS), time domain diffusive correlation spectroscopy (TD-DCS), and time domain Digital Optical Tomography (TD-DOT).

The optical measurement system 100 (e.g., an optical measurement system that is implemented by a wearable device or other configuration, and that employs a TD-NIRS measurement technique) may detect blood oxygenation levels and blood volume levels by measuring the change in shape of laser pulses after they have passed through target tissue, e.g., brain, muscle, finger, etc. As used herein, a shape of laser pulses refers to a temporal shape, as represented for example by a histogram generated by a time-to-digital converter (TDC) coupled to an output of a photodetector, as will be described more fully below.

As shown, optical measurement system 100 includes a detector 104 that includes a plurality of individual photodetectors (e.g., photodetector 106), a processor 108 coupled to detector 104, a light source 110, a controller 112, and optical conduits 114 and 116 (e.g., light pipes). However, one or more of these components may not, in certain embodiments, be considered to be a part of optical measurement system 100. For example, in implementations where optical measurement system 100 is wearable by a user, processor 108 and/or controller 112 may in some embodiments be separate from optical measurement system 100 and not configured to be worn by the user.

Detector 104 may include any number of photodetectors 106 as may serve a particular implementation, such as $2^n$ photodetectors (e.g., 256, 512, . . . , 16384, etc.), where n is an integer greater than or equal to one (e.g., 4, 5, 8, 10, 11, 14, etc.). Photodetectors 106 may be arranged in any suitable manner.

Photodetectors 106 may each be implemented by any suitable circuit configured to detect individual photons of light incident upon photodetectors 106. For example, each photodetector 106 may be implemented by a single photon avalanche diode (SPAD) circuit and/or other circuitry as may serve a particular implementation.

Processor 108 may be implemented by one or more physical processing (e.g., computing) devices. In some examples, processor 108 may execute instructions (e.g., software) configured to perform one or more of the operations described herein.

Light source 110 may be implemented by any suitable component configured to generate and emit light. For example, light source 110 may be implemented by one or more laser diodes, distributed feedback (DFB) lasers, super luminescent diodes (SLDs), light emitting diodes (LEDs), diode-pumped solid-state (DPSS) lasers, super luminescent light emitting diodes (sLEDs), vertical-cavity surface-emitting lasers (VCSELs), titanium sapphire lasers, micro light emitting diodes (mLEDs), and/or any other suitable laser or light source. In some examples, the light emitted by light source 110 is high coherence light (e.g., light that has a coherence length of at least 5 centimeters) at a predetermined center wavelength.

Light source 110 is controlled by controller 112, which may be implemented by any suitable computing device (e.g., processor 108), integrated circuit, and/or combination of hardware and/or software as may serve a particular implementation. In some examples, controller 112 is configured to control light source 110 by turning light source 110 on and off and/or setting an intensity of light generated by light source 110. Controller 112 may be manually operated by a user, or may be programmed to control light source 110 automatically.

Light emitted by light source 110 may travel via an optical conduit 114 (e.g., a light pipe, a light guide, a waveguide, a single-mode optical fiber, and/or or a multi-mode optical fiber) to body 102 of a subject. In cases where optical conduit 114 is implemented by a light guide, the light guide may be spring loaded and/or have a cantilever mechanism to allow for conformably pressing the light guide firmly against body 102.

Body 102 may include any suitable turbid medium. For example, in some implementations, body 102 is a head or any other body part of a human or other animal. Alternatively, body 102 may be a non-living object. For illustrative purposes, it will be assumed in the examples provided herein that body 102 is a human head.

As indicated by an arrow 120, the light emitted by light source 110 enters body 102 at a first location 122 on body 102. Accordingly, a distal end of optical conduit 114 may be positioned at (e.g., right above, in physical contact with, or physically attached to) first location 122 (e.g., to a scalp of the subject). In some examples, the light may emerge from optical conduit 114 and spread out to a certain spot size on body 102 to fall under a predetermined safety limit. At least a portion of the light indicated by arrow 120 may be scattered within body 102.

As used herein, "distal" means nearer, along the optical path of the light emitted by light source 110 or the light received by detector 104, to the target (e.g., within body 102) than to light source 110 or detector 104. Thus, the distal end of optical conduit 114 is nearer to body 102 than to light source 110, and the distal end of optical conduit 116 is nearer to body 102 than to detector 104. Additionally, as used herein, "proximal" means nearer, along the optical path of the light emitted by light source 110 or the light received by detector 104, to light source 110 or detector 104 than to body 102. Thus, the proximal end of optical conduit 114 is nearer to light source 110 than to body 102, and the proximal end of optical conduit 116 is nearer to detector 104 than to body 102.

As shown, the distal end of optical conduit 116 (e.g., a light pipe, a light guide, a waveguide, a single-mode optical fiber, and/or a multi-mode optical fiber) is positioned at (e.g., right above, in physical contact with, or physically attached to) output location 126 on body 102. In this manner, optical conduit 116 may collect at least a portion of the scattered light (indicated as light 124) as it exits body 102 at location 126 and carry light 124 to detector 104. Light 124 may pass through one or more lenses and/or other optical elements (not shown) that direct light 124 onto each of the photodetectors 106 included in detector 104.

Photodetectors 106 may be connected in parallel in detector 104. An output of each of photodetectors 106 may be accumulated to generate an accumulated output of detector 104. Processor 108 may receive the accumulated output and determine, based on the accumulated output, a temporal distribution of photons detected by photodetectors 106. Processor 108 may then generate, based on the temporal distribution, a histogram representing a light pulse response of a target (e.g., brain tissue, blood flow, etc.) in body 102. Example embodiments of accumulated outputs are described herein.

Figure 2:
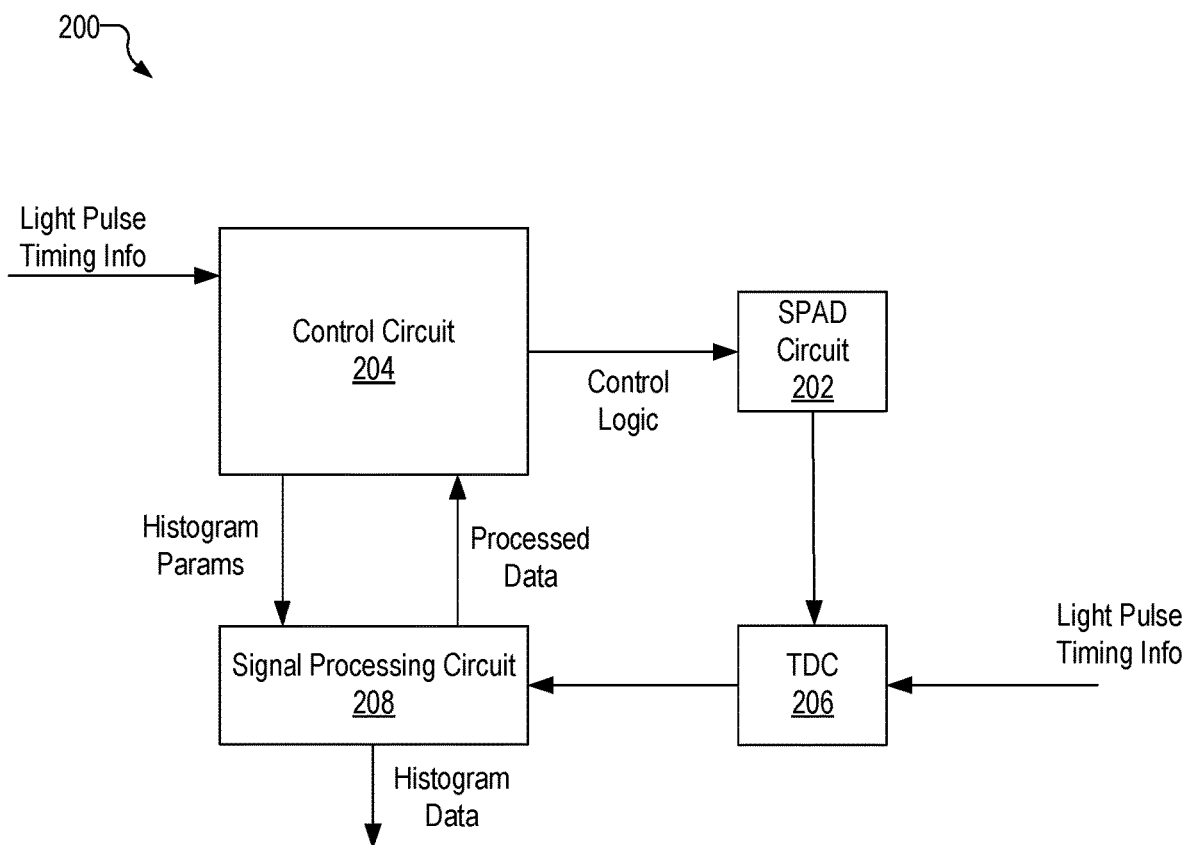
FIG. 2 illustrates an exemplary detector architecture.

FIG. 2 illustrates an exemplary detector architecture 200 that may be used in accordance with the systems and methods described herein. As shown, architecture 200 includes a SPAD circuit 202 that implements photodetector 106, a control circuit 204, a time-to-digital converter (TDC) 206, and a signal processing circuit 208. Architecture 200 may include additional or alternative components as may serve a particular implementation.

In some examples, SPAD circuit 202 may include a SPAD and a fast gating circuit configured to operate together to detect a photon incident upon the SPAD. As described herein, SPAD circuit 202 may generate an output when SPAD circuit 202 detects a photon.

The fast gating circuit included in SPAD circuit 202 may be implemented in any suitable manner. For example, the fast gating circuit may be implemented by an active voltage source, a capacitor that is pre-charged with a bias voltage before a command is provided to arm the SPAD, and/or in any other suitable manner.

In some alternative configurations, SPAD circuit 202 does not include a fast gating circuit. In these configurations, the SPAD included in SPAD circuit 202 may be gated in any suitable manner or be configured to operate in a free running mode with passive quenching.

Control circuit 204 may be implemented by an application specific integrated circuit (ASIC) or any other suitable circuit configured to control an operation of various components within SPAD circuit 202. For example, control circuit 204 may output control logic that puts the SPAD included in SPAD circuit 202 in either an armed or a disarmed state.

In some examples, control circuit 204 may control an arming and a disarming of a SPAD included in SPAD circuit 202. Control circuit 204 may also control a programmable gate width, which specifies how long the SPAD is kept in an armed state before being disarmed.

Control circuit 204 is further configured to control signal processing circuit 208. For example, control circuit 204 may provide histogram parameters (e.g., time bins, number of light pulses, type of histogram, etc.) to signal processing circuit 208. Signal processing circuit 208 may generate histogram data in accordance with the histogram parameters. In some examples, control circuit 204 is at least partially implemented by controller 112.

TDC 206 is configured to measure a time difference between an occurrence of an output pulse generated by SPAD circuit 202 and an occurrence of a light pulse. To this end, TDC 206 may also receive the same light pulse timing information that control circuit 204 receives. TDC 206 may be implemented by any suitable circuitry as may serve a particular implementation.

Signal processing circuit 208 is configured to perform one or more signal processing operations on data output by TDC 206. For example, signal processing circuit 208 may generate histogram data based on the data output by TDC 206 and in accordance with histogram parameters provided by control circuit 204. To illustrate, signal processing circuit 208 may generate, store, transmit, compress, analyze, decode, and/or otherwise process histograms based on the data output by TDC 206. In some examples, signal processing circuit 208 may provide processed data to control circuit 204, which may use the processed data in any suitable manner. In some examples, signal processing circuit 208 is at least partially implemented by processor 108.

In some examples, each photodetector 106 (e.g., SPAD circuit 202) may have a dedicated TDC 206 associated therewith. For example, for an array of N photodetectors 106, there may be a corresponding array of N TDCs 206. Likewise, a single control circuit 204 and a single signal processing circuit 208 may be provided for one or more photodetectors 106 and/or TDCs 206.

Figure 3:
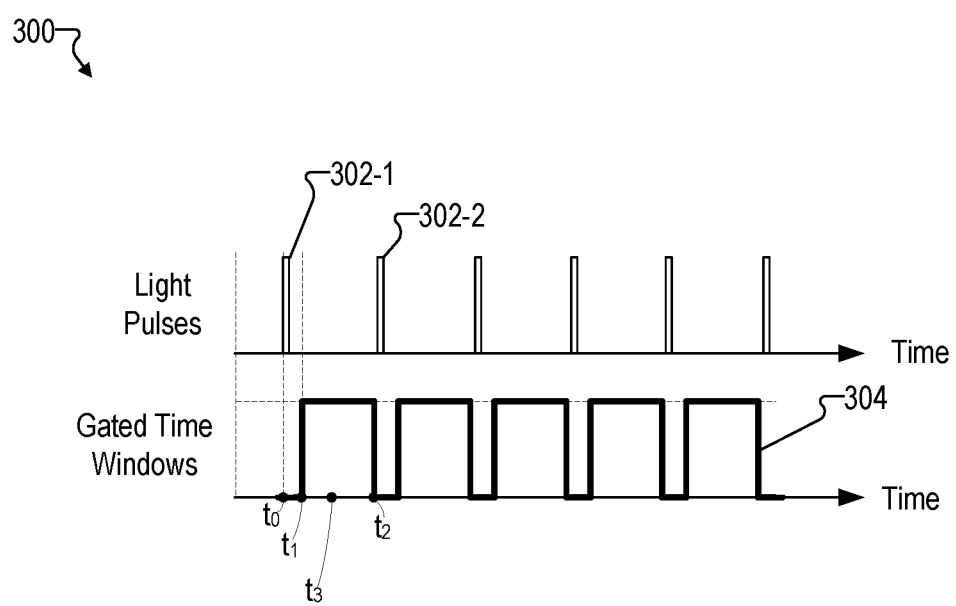
FIG. 3 illustrates an exemplary timing diagram for performing an optical measurement operation using an optical measurement system.

FIG. 3 illustrates an exemplary timing diagram 300 for performing an optical measurement operation using optical measurement system 100. Optical measurement system 100 may be configured to perform the optical measurement operation by directing light pulses (e.g., laser pulses) toward a target within a body (e.g., body 102). The light pulses may be short (e.g., 10-2000 picoseconds (ps)) and repeated at a high frequency (e.g., between 100,000 hertz (Hz) and 100 megahertz (MHz)). The light pulses may be scattered by the target and then detected by optical measurement system 100. Optical measurement system 100 may measure a time relative to the light pulse for each detected photon. By counting the number of photons detected at each time relative to each light pulse repeated over a plurality of light pulses, optical measurement system 100 may generate a histogram that represents a light pulse response of the target (e.g., a temporal point spread function (TPSF)). The terms histogram and TPSF are used interchangeably herein to refer to a light pulse response of a target.

For example, timing diagram 300 shows a sequence of light pulses 302 (e.g., light pulses 302-1 and 302-2) that may be applied to the target (e.g., tissue within a brain of a user, blood flow, a fluorescent material used as a probe in a body of a user, etc.). Timing diagram 300 also shows a pulse wave 304 representing predetermined gated time windows (also referred as gated time periods) during which photodetectors 106 are gated ON (i.e., armed) to detect photons. Referring to light pulse 302-1, light pulse 302-1 is applied at a time $t_0$. At a time $t_1$, a first instance of the predetermined gated time window begins. Photodetectors 106 may be armed at time $t_1$, enabling photodetectors 106 to detect photons scattered by the target during the predetermined gated time window. In this example, time $t_1$ is set to be at a certain time after time $t_0$, which may minimize photons detected directly from the laser pulse, before the laser pulse reaches the target. However, in some alternative examples, time $t_1$ is set to be equal to time $t_0$.

At a time $t_2$, the predetermined gated time window ends. In some examples, photodetectors 106 may be disarmed at time $t_2$. In other examples, photodetectors 106 may be reset (e.g., disarmed and re-armed) at time $t_2$ or at a time subsequent to time $t_2$. During the predetermined gated time window, photodetectors 106 may detect photons scattered by the target. Photodetectors 106 may be configured to remain armed during the predetermined gated time window such that photodetectors 106 maintain an output upon detecting a photon during the predetermined gated time window. For example, a photodetector 106 may detect a photon at a time $t_3$, which is during the predetermined gated time window between times $t_1$ and $t_2$. The photodetector 106 may be configured to provide an output indicating that the photodetector 106 has detected a photon. The photodetector 106 may be configured to continue providing the output until time $t_2$, when the photodetector may be disarmed and/or reset. Optical measurement system 100 may generate an accumulated output from the plurality of photodetectors. Optical measurement system 100 may sample the accumulated output to determine times at which photons are detected by photodetectors 106 to generate a TPSF.

As described herein, the systems, circuits, and methods described herein may obviate the need for the gated time windows described in connection with FIG. 3, thereby obviating the need for fast gating circuitry to be included in optical measurement system 100.

Figure 4:
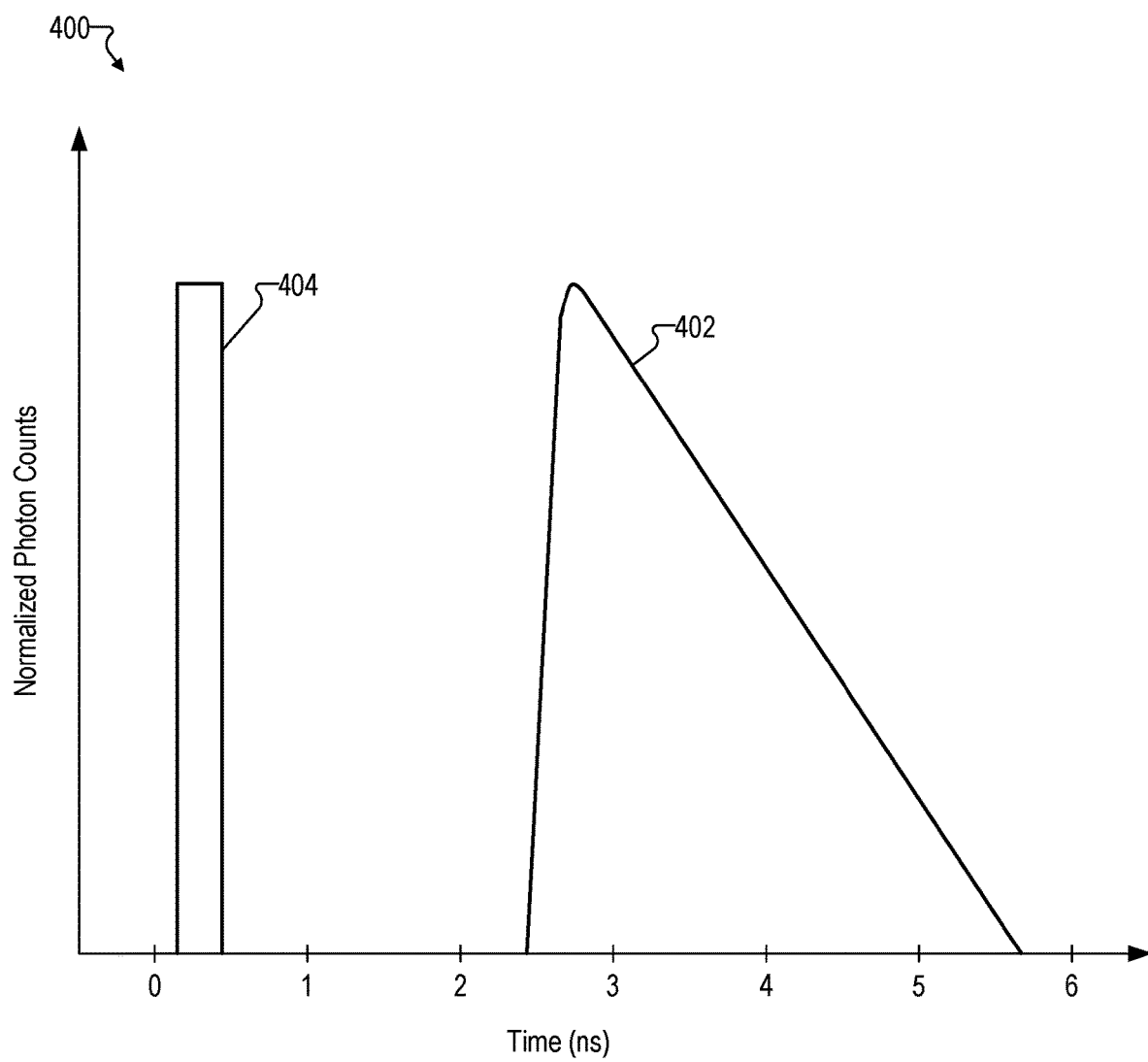
FIG. 4 illustrates a graph of an exemplary temporal point spread function that may be generated by an optical measurement system in response to a light pulse.

FIG. 4 illustrates a graph 400 of an exemplary TPSF 402 that may be generated by optical measurement system 100 in response to a light pulse 404 (which, in practice, represents a plurality of light pulses). Graph 400 shows a normalized count of photons on a y-axis and time bins on an x-axis. As shown, TPSF 402 is delayed with respect to a temporal occurrence of light pulse 404. In some examples, the number of photons detected in each time bin subsequent to each occurrence of light pulse 404 may be aggregated (e.g., integrated) to generate TPSF 402. TPSF 402 may be analyzed and/or processed in any suitable manner to determine or infer detected neural activity.

Optical measurement system 100 may be implemented by or included in any suitable device. For example, optical measurement system 100 may be included, in whole or in part, in a non-invasive wearable device (e.g., a headpiece) that a user may wear to perform one or more diagnostic, imaging, analytical, and/or consumer-related operations. The non-invasive wearable device may be placed on a user's head or other part of the user to detect neural activity. In some examples, such neural activity may be used to make behavioral and mental state analysis, awareness and predictions for the user.

Mental state described herein refers to the measured neural activity related to physiological brain states and/or mental brain states, e.g., joy, excitement, relaxation, surprise, fear, stress, anxiety, sadness, anger, disgust, contempt, contentment, calmness, focus, attention, approval, creativity, positive or negative reflections/attitude on experiences or the use of objects, etc. Further details on the methods and systems related to a predicted brain state, behavior, preferences, or attitude of the user, and the creation, training, and use of neuromes can be found in U.S. Provisional Patent Application No. 63/047,991, filed Jul. 3, 2020. Exemplary measurement systems and methods using biofeedback for awareness and modulation of mental state are described in more detail in U.S. patent application Ser. No. 16/364,338, filed Mar. 26, 2019, published as US2020/0196932A1. Exemplary measurement systems and methods used for detecting and modulating the mental state of a user using entertainment selections, e.g., music, film/video, are described in more detail in U.S. patent application Ser. No. 16/835,972, filed Mar. 31, 2020, published as US2020/0315510A1. Exemplary measurement systems and methods used for detecting and modulating the mental state of a user using product formulation from, e.g., beverages, food, selective food/drink ingredients, fragrances, and assessment based on product-elicited brain state measurements are described in more detail in U.S. patent application Ser. No. 16/853,614, filed Apr. 20, 2020, published as US2020/0337624A1. Exemplary measurement systems and methods used for detecting and modulating the mental state of a user through awareness of priming effects are described in more detail in U.S. patent application Ser. No. 16/885,596, filed May 28, 2020, published as US2020/0390358A1. These applications and corresponding U.S. publications are incorporated herein by reference in their entirety.

Figure 5:
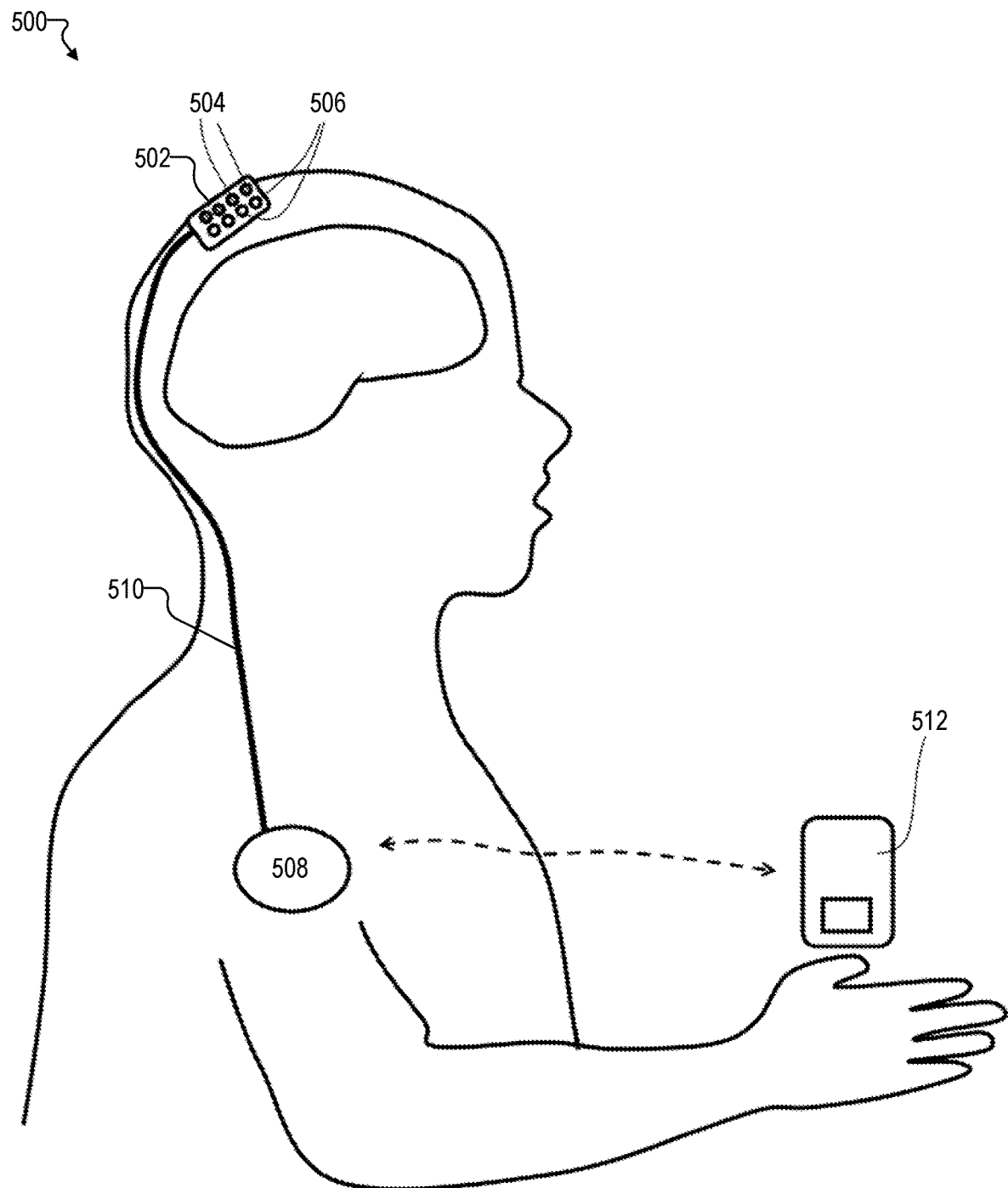
FIG. 5 shows an exemplary non-invasive wearable brain interface system.

FIG. 5 shows an exemplary non-invasive wearable brain interface system 500 ("brain interface system 500") that implements optical measurement system 100 (shown in FIG.

1). As shown, brain interface system 500 includes a head-mountable component 502 configured to be attached to a user's head. Head-mountable component 502 may be implemented by a cap shape that is worn on a head of a user. Alternative implementations of head-mountable component 502 include helmets, beanies, headbands, other hat shapes, or other forms conformable to be worn on a user's head, etc. Head-mountable component 502 may be made out of any suitable cloth, soft polymer, plastic, hard shell, and/or any other suitable material as may serve a particular implementation. Examples of headgears used with wearable brain interface systems are described more fully in U.S. Pat. No. 10,340,408, incorporated herein by reference in its entirety.

Head-mountable component 502 includes a plurality of detectors 504, which may implement or be similar to detector 104, and a plurality of light sources 506, which may be implemented by or be similar to light source 110. It will be recognized that in some alternative embodiments, head-mountable component 502 may include a single detector 504 and/or a single light source 506.

Brain interface system 500 may be used for controlling an optical path to the brain and for transforming photodetector measurements into an intensity value that represents an optical property of a target within the brain. Brain interface system 500 allows optical detection of deep anatomical locations beyond skin and bone (e.g., skull) by extracting data from photons originating from light source 506 and emitted to a target location within the user's brain, in contrast to conventional imaging systems and methods (e.g., optical coherence tomography (OCT)), which only image superficial tissue structures or through optically transparent structures.

Brain interface system 500 may further include a processor 508 configured to communicate with (e.g., control and/or receive signals from) detectors 504 and light sources 506 by way of a communication link 510. Communication link 510 may include any suitable wired and/or wireless communication link. Processor 508 may include any suitable housing and may be located on the user's scalp, neck, shoulders, chest, or arm, as may be desirable. In some variations, processor 508 may be integrated in the same assembly housing as detectors 504 and light sources 506.

As shown, brain interface system 500 may optionally include a remote processor 512 in communication with processor 508. For example, remote processor 512 may store measured data from detectors 504 and/or processor 508 from previous detection sessions and/or from multiple brain interface systems (not shown). Power for detectors 504, light sources 506, and/or processor 508 may be provided via a wearable battery (not shown). In some examples, processor 508 and the battery may be enclosed in a single housing, and wires carrying power signals from processor 508 and the battery may extend to detectors 504 and light sources 506. Alternatively, power may be provided wirelessly (e.g., by induction).

In some alternative embodiments, head mountable component 502 does not include individual light sources. Instead, a light source configured to generate the light that is detected by detectors 504 may be included elsewhere in brain interface system 500. For example, a light source may be included in processor 508 and coupled to head mountable component 502 through optical connections.

Optical measurement system 100 may alternatively be included in a non-wearable device (e.g., a medical device and/or consumer device that is placed near the head or other body part of a user to perform one or more diagnostic, imaging, and/or consumer-related operations). Optical measurement system 100 may alternatively be included in a sub-assembly enclosure of a wearable invasive device (e.g., an implantable medical device for brain recording and imaging).

Figure 6:
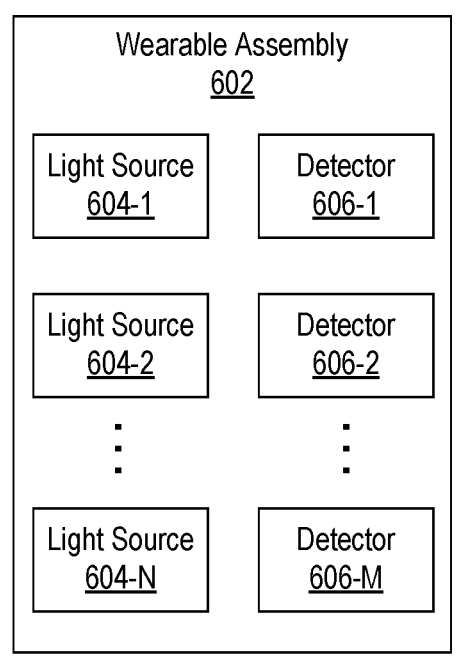
FIG. 6 shows an exemplary optical measurement system.

FIG. 6 shows an exemplary optical measurement system 600 in accordance with the principles described herein. Optical measurement system 600 may be an implementation of optical measurement system 100 and, as shown, includes a wearable assembly 602, which includes N light sources 604 (e.g., light sources 604-1 through 604-N) and M detectors 606 (e.g., detectors 606-1 through 606-M). Optical measurement system 600 may include any of the other components of optical measurement system 100 as may serve a particular implementation. N and M may each be any suitable value (i.e., there may be any number of light sources 604 and detectors 606 included in optical measurement system 600 as may serve a particular implementation).

Light sources 604 are each configured to emit light (e.g., a sequence of light pulses) and may be implemented by any of the light sources described herein. Detectors 606 may each be configured to detect arrival times for photons of the light emitted by one or more light sources 604 after the light is scattered by the target. For example, a detector 606 may include a photodetector configured to generate a photodetector output pulse in response to detecting a photon of the light and a TDC configured to record a timestamp symbol in response to an occurrence of the photodetector output pulse, the timestamp symbol representative of an arrival time for the photon (i.e., when the photon is detected by the photodetector).

Wearable assembly 602 may be implemented by any of the wearable devices, modular assemblies, and/or wearable units described herein. For example, wearable assembly 602 may be implemented by a wearable device (e.g., headgear) configured to be worn on a user's head. Wearable assembly 602 may additionally or alternatively be configured to be worn on any other part of a user's body.

Optical measurement system 600 may be modular in that one or more components of optical measurement system 600 may be removed, changed out, or otherwise modified as may serve a particular implementation. As such, optical measurement system 600 may be configured to conform to three-dimensional surface geometries, such as a user's head. Exemplary modular multimodal measurement systems are described in more detail in U.S. patent application Ser. No. 17/176,460, filed Feb. 16, 2021, U.S. patent application Ser. No. 17/176,470, filed Feb. 16, 2021, U.S. patent application Ser. No. 17/176,487, filed Feb. 16, 2021, U.S. patent application Ser. No. 17/176,539, filed Feb. 16, 2021, U.S. patent application Ser. No. 17/176,560, filed Feb. 16, 2021, and U.S. patent application Ser. No. 17/176,466, filed Feb. 16, 2021, which applications are incorporated herein by reference in their respective entireties.

Figure 7:
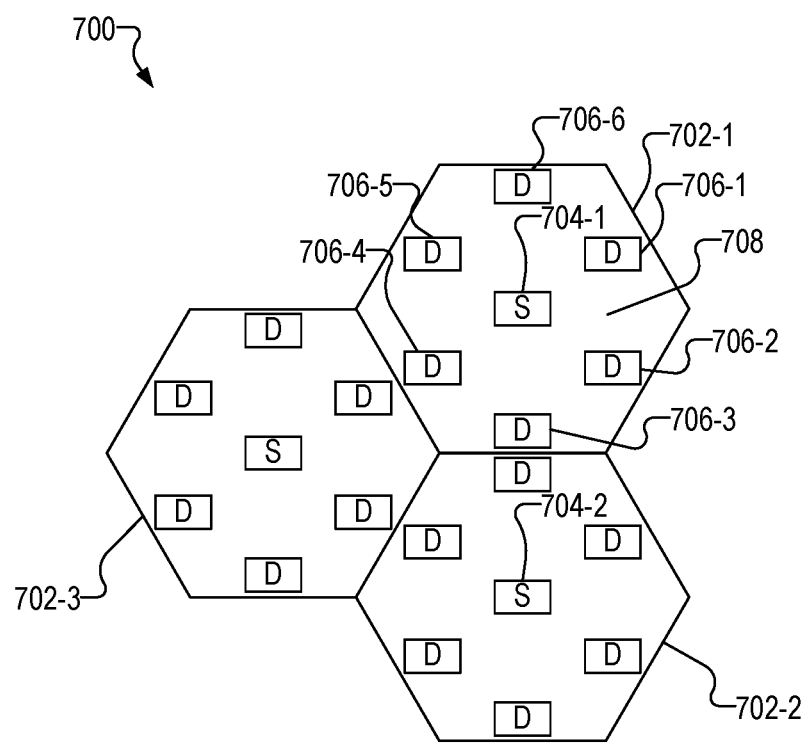
FIG. 7 shows an illustrative modular assembly.

FIG. 7 shows an illustrative modular assembly 700 that may implement optical measurement system 600. Modular assembly 700 is illustrative of the many different implementations of optical measurement system 600 that may be realized in accordance with the principles described herein.

As shown, modular assembly 700 includes a plurality of modules 702 (e.g., modules 702-1 through 702-3). While three modules 702 are shown to be included in modular assembly 700, in alternative configurations, any number of modules 702 (e.g., a single module up to sixteen or more modules) may be included in modular assembly 700.

Each module 702 includes a light source (e.g., light source 704-1 of module 702-1 and light source 704-2 of module 702-2) and a plurality of detectors (e.g., detectors 706-1 through 706-6 of module 702-1). In the particular implementation shown in FIG. 7, each module 702 includes a single light source and six detectors. Each light source is labeled "S" and each detector is labeled "D".

Each light source depicted in FIG. 7 may be implemented by one or more light sources similar to light source 110 and may be configured to emit light directed at a target (e.g., the brain).

Each light source depicted in FIG. 7 may be located at a center region of a surface of the light source's corresponding module. For example, light source 704-1 is located at a center region of a surface 708 of module 702-1. In alternative implementations, a light source of a module may be located away from a center region of the module.

Each detector depicted in FIG. 7 may implement or be similar to detector 104 and may include a plurality of photodetectors (e.g., SPADs) as well as other circuitry (e.g., TDCs), and may be configured to detect arrival times for photons of the light emitted by one or more light sources after the light is scattered by the target.

The detectors of a module may be distributed around the light source of the module. For example, detectors 706 of module 702-1 are distributed around light source 704-1 on surface 708 of module 702-1. In this configuration, detectors 706 may be configured to detect photon arrival times for photons included in light pulses emitted by light source 704-1. In some examples, one or more detectors 706 may be close enough to other light sources to detect photon arrival times for photons included in light pulses emitted by the other light sources. For example, because detector 706-3 is adjacent to module 702-2, detector 706-3 may be configured to detect photon arrival times for photons included in light pulses emitted by light source 704-2 (in addition to detecting photon arrival times for photons included in light pulses emitted by light source 704-1).

In some examples, the detectors of a module may all be equidistant from the light source of the same module. In other words, the spacing between a light source (i.e., a distal end portion of a light source optical conduit) and the detectors (i.e., distal end portions of optical conduits for each detector) are maintained at the same fixed distance on each module to ensure homogeneous coverage over specific areas and to facilitate processing of the detected signals. The fixed spacing also provides consistent spatial (lateral and depth) resolution across the target area of interest, e.g., brain tissue. Moreover, maintaining a known distance between the light source, e.g., light emitter, and the detector allows subsequent processing of the detected signals to infer spatial (e.g., depth localization, inverse modeling) information about the detected signals. Detectors of a module may be alternatively disposed on the module as may serve a particular implementation.

Figure 8A:
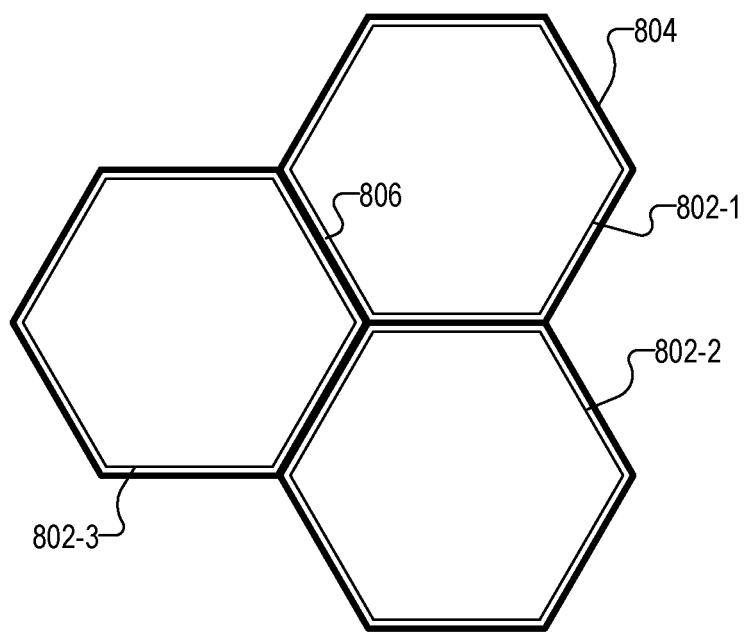
FIGS. 8A-8B show an exemplary implementation of the modular assembly of FIG. 7.
Figure 8B:
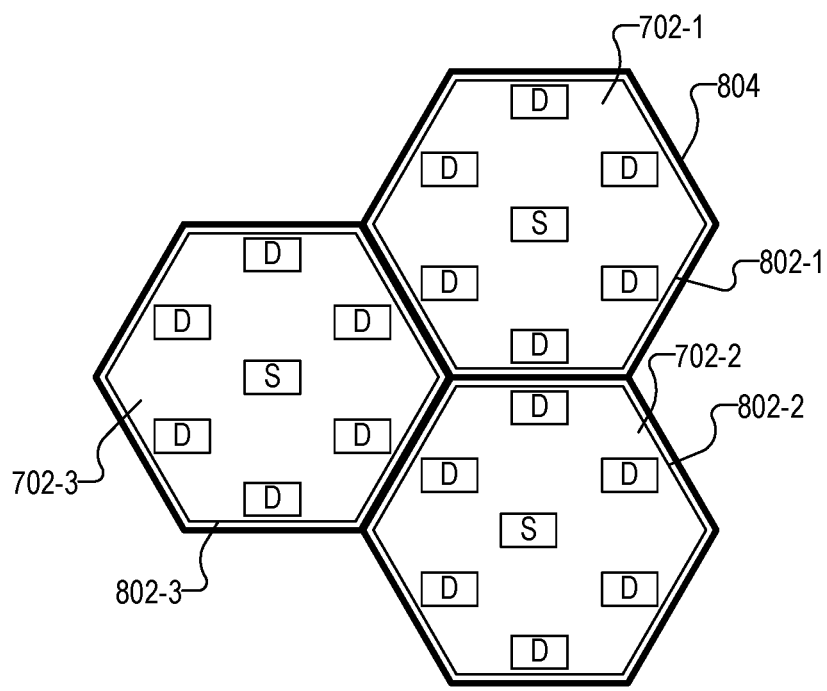

In FIG. 7, modules 702 are shown to be adjacent to and touching one another. Modules 702 may alternatively be spaced apart from one another. For example, FIGS. 8A-8B show an exemplary implementation of modular assembly 700 in which modules 702 are configured to be inserted into individual slots 802 (e.g., slots 802-1 through 802-3, also referred to as cutouts) of a wearable assembly 804. In particular, FIG. 8A shows the individual slots 802 of the wearable assembly 804 before modules 702 have been inserted into respective slots 802, and FIG. 8B shows wearable assembly 804 with individual modules 702 inserted into respective individual slots 802.

Wearable assembly 804 may implement wearable assembly 602 and may be configured as headgear and/or any other type of device configured to be worn by a user.

As shown in FIG. 8A, each slot 802 is surrounded by a wall (e.g., wall 806) such that when modules 702 are inserted into their respective individual slots 802, the walls physically separate modules 702 one from another. In alternative embodiments, a module (e.g., module 702-1) may be in at least partial physical contact with a neighboring module (e.g., module 702-2).

Each of the modules described herein may be inserted into appropriately shaped slots or cutouts of a wearable assembly, as described in connection with FIGS. 8A-8B. However, for ease of explanation, such wearable assemblies are not shown in the figures.

As shown in FIGS. 7 and 8B, modules 702 may have a hexagonal shape. Modules 702 may alternatively have any other suitable geometry (e.g., in the shape of a pentagon, octagon, square, rectangular, circular, triangular, free-form, etc.).

Figure 9:
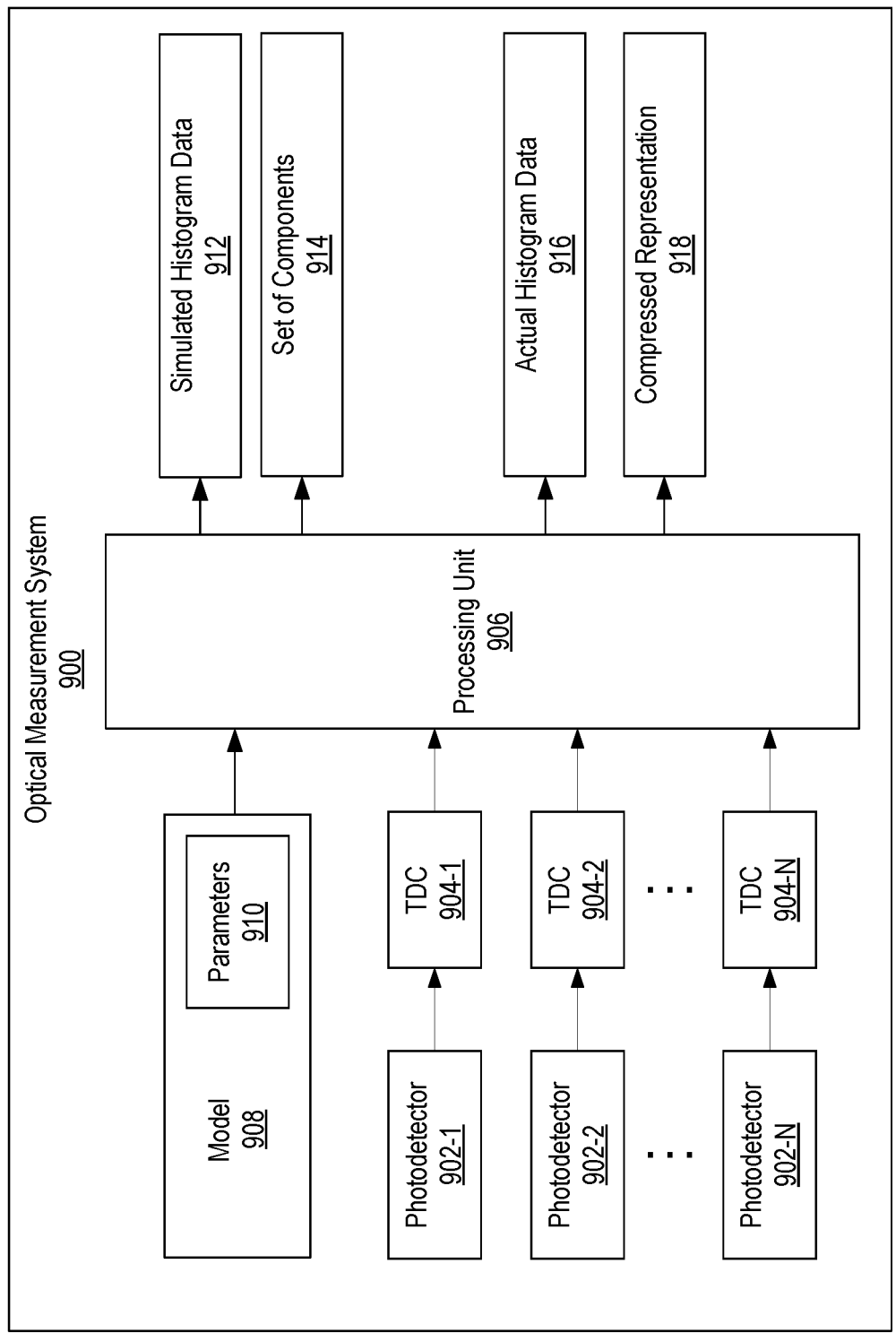
FIGS. 9-10 show exemplary optical measurement systems.

FIG. 9 shows an exemplary optical measurement system 900 that may be similar to and/or implement any of the optical measurement systems described herein. As shown, optical measurement system 900 includes a plurality of photodetectors 902 (e.g., photodetectors 902-1 through 902-N), a plurality of TDCs 904 (e.g., TDCs 904-1 through 904-N), and a processing unit 906. Each of these elements may be similar to the elements described herein.

For example, photodetectors 902 may be implemented by any of the photodetectors described herein and may be configured to detect photons of light after the light is scattered by the target and/or other layers of tissue. TDCs 904 may be implemented by any of the TDCs described herein and may be configured to record timestamp symbols representative of when the photons are detected by photodetectors 902.

Processing unit 906 may be implemented by processor 108, controller 112, control circuit 204, and/or any other suitable processing and/or computing device or circuit. An exemplary implementation of processing unit 906 is described herein.

As shown, processing unit 906 may be configured to access (e.g., receive, retrieve, generate, etc.) a model 908. Data represented by model 908 may be stored within processing unit 906, stored by a computing device separate from and communicatively coupled to processing unit 906 (e.g., by way of a network), and/or otherwise provided to processing unit 906.

Model 908 may be configured to model the physics of simulated light scattered by a simulated target. Model 908 may include a plurality of parameters 910, which may include any characteristics of model 908 for which different values may be applied in different simulations and/or instances of model 908. For example, parameters 910 may include characteristics such as an attenuation coefficient of the simulated target, an absorption coefficient of the simulated target, a scattering coefficient of the simulated target, a distance between a light source and a photodetector, a length of pulses of light directed at the simulated target, a total time that the light pulses are directed at the simulated target, a length of each time gate for measurements, etc.

Using model 908 with a plurality of values for one or more of parameters 910, processing unit 906 may generate simulated histogram data 912. Simulated histogram data 912 may include an expansive set of possible histogram data, since processing unit 906 may use any number of suitable values for any number of suitable parameters 910. Thus, simulated histogram data 912 may be configured to be able to represent most of any actual histograms processing unit 906 may expect to generate based on physical measurements.

Processing unit 906 may determine, based on the simulated histogram data 912, a set of components 914 that represent the set of possible histogram data of simulated histogram data 912. The set of components 914 may be any set of elements that may be used to represent the histograms of simulated histogram data 912 where the number of elements is fewer than the number of data points of the histograms, i.e., the low-dimensional representation of the full data. Thus, the set of components 914 has a reduced dimensionality from simulated histogram data 912. The representing of a histogram by the set of components 914 may include encoding the information of some or all of the histogram using the set of components 914. For instance, each histogram may be defined as a particular combination of the set of components 914. The set of components 914 may be determined in any suitable manner, such as described herein.

Processing unit 906 may receive output signals from TDCs 904. The output signals may include data representative of recorded timestamp symbols that indicate arrival times of photons at corresponding photodetectors 902 after the photons are scattered by a physical target (e.g., body 102). Processing unit 906 may generate, based on the output signals, actual histogram data 916 associated with the physical target.

Processing unit 906 may generate a compressed representation 918 of actual histogram data 916 based on the set of components 914. As the set of components 914 provide components with which an expansive set of possible histogram data may be represented, actual histogram data 916 may largely fall into the set of possible histogram data that may be represented by the set of components 914 to generate compressed representation 918. Processing unit 906 may generate compressed representation 918 in any suitable manner, such as further described herein.

Processing unit 906 may perform any suitable operations with compressed representation 918, such as storing, providing, transmitting, further processing, etc. the data of compressed representation 918. As the data of compressed representation 918 represents the information of actual histogram data 916 using a reduced dimensionality, such operations may use fewer resources (e.g., memory, bandwidth, processing capabilities and/or power, storage space, etc.) to perform than with the data with a full or greater dimensionality. In some conventional optical measurement systems, other conventional processes may be used to reduce the dimensionality of the histogram data. Such conventional processes may be naïve, simplistic, and/or require a priori information for reducing dimensions, resulting in a loss in at least some information that leads to inaccurate reconstructions of the histogram data. In contrast, simulated histogram data 912 provides a set of possible histogram data on which the set of components 914 is generated, which may then be used to represent any actual histogram data. Thus, compressed representation 918, generated based on the set of components 914, may reduce the dimensionality of actual histogram data 916 in a manner that allows for a more accurate reconstruction of the histogram data.

Additionally, the set of components 914 may be a subset of a larger set of components determined to represent simulated histogram data 912 (and actual histogram data 916). By using a subset of the components, the dimensionality may be further reduced. Further, using a subset of the components may result in a filtering of noise, as components that contribute less significantly to the histograms may be excluded in the subset.

In some examples, processing unit 906 may update the set of components 914 based on actual histogram data 916. For example, actual histogram data 916 may include histograms that differ from simulated histogram data 912. Such histograms may then be incorporated in the set of possible histograms and processing unit 906 may generate a new set of components 914 that represent the updated set of possible histograms including actual histogram data 916. Additionally or alternatively, actual histogram data 916 may provide information to processing unit 906 showing which types of histograms or characteristics of histograms of the set of possible histograms are more likely encountered in actual histogram data 916. Based on such information, processing unit 906 may update the set of components 914, such as by excluding particular components, reordering components by frequency in actual histogram data 916, etc.

Additionally or alternatively, some differences in actual histogram data 916 and simulated histogram data 912 may be due to noise introduced by components of optical measurement system 900 (e.g., photodetectors 902, TDC 904, wires, etc.). As simulated histogram data 912 is based on model 908, such noise may be absent from the histograms of simulated histogram data 912. In such cases, generating compressed representation 918 of actual histogram data 912 using the set of components 914 may result in filtering the noise from actual histogram data 916. As the set of components 914 may not be configured to represent the additions to simulated histogram data 912 that is noise, compressing actual histogram data 916 into compressed representation 918 and then reconstructing compressed representation 918 may result in decompressed histograms that are closer to simulated histogram data 912, filtering the noise in actual histogram data 916. Further, if such noise is systemic and consistent in the histograms of actual histogram data 916, incorporating actual histogram data 916 to update the set of components 914 may still result in a filtering of such noise. For instance, if the set of components 914 is based on a covariance in the set of possible histograms (e.g., eigenvectors), the systemic nature of the noise may result in a minimal change or no change in the set of components 914.

Figure 10:
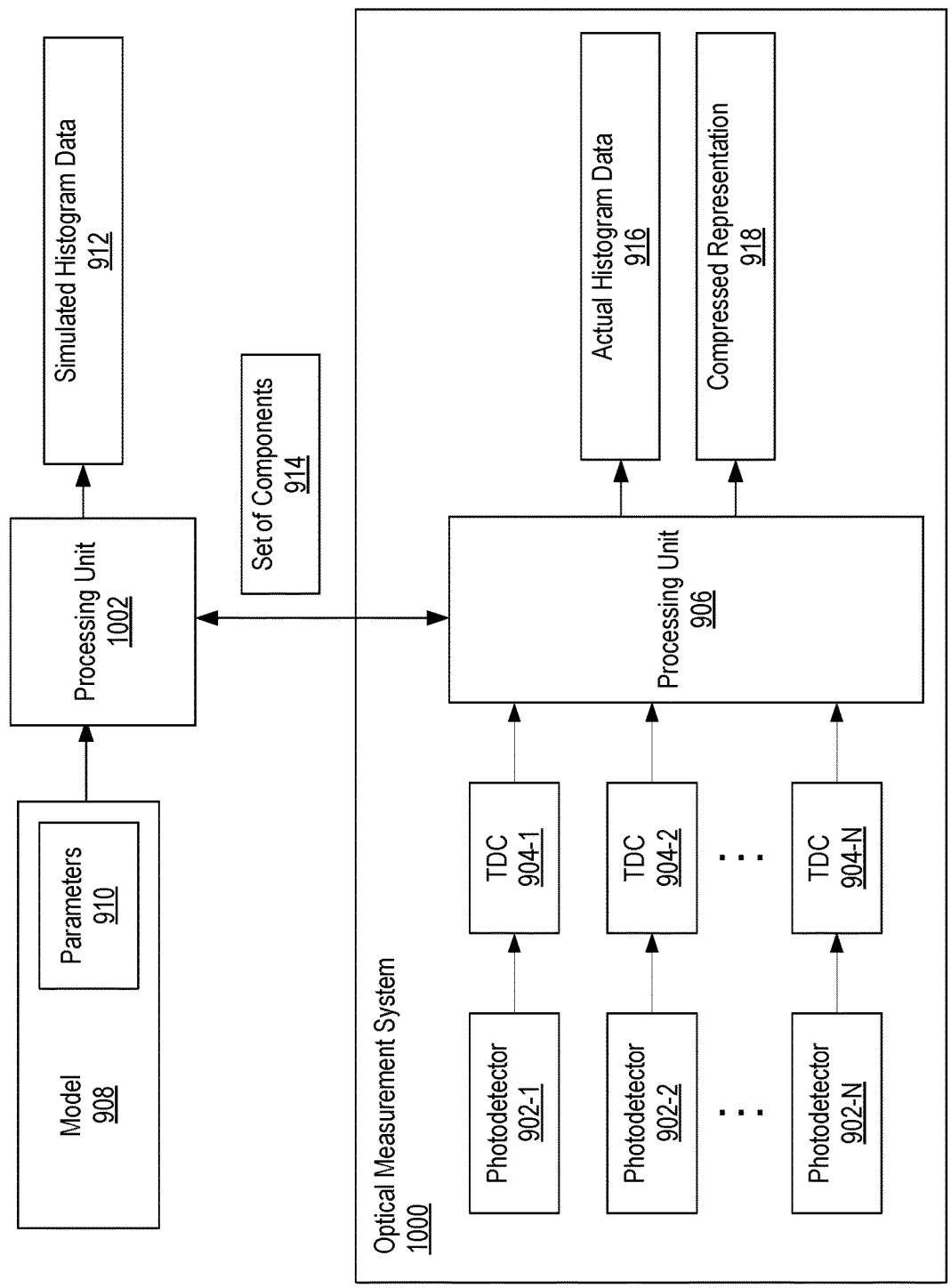

FIG. 10 shows another exemplary optical measurement system 1000 that may be similar to optical measurement system 900, except optical measurement system 1000 may be communicatively coupled to an additional processing unit 1002 that is configured to perform some or all of the operations for generating the set of components 914. Processing unit 1002 may be implemented by any suitable processing and/or computer device and/or any of the processors, processing units, and/or circuits described herein.

Similar to optical measurement system 900, optical measurement system 1000 includes photodetectors 902, TDCs 904, and processing unit 906. However, processing unit 1002 accesses model 908 and generates simulated histogram data 912 and the set of components 914. Processing unit 1002 may transmit the set of components 914 to optical measurement system 1000 (e.g., processing unit 906). Processing unit 906 may generate actual histogram data 916 based on output signals from TDCs 904 and determine compressed representation 918 of actual histogram data 916 based on the received set of components 914. Processing unit 906 and/or processing unit 1002 may perform any suitable operations on compressed representation 918.

In some examples, processing unit 906 may transmit actual histogram data 916 (and/or compressed representation 918) to processing unit 1002 so that processing unit 1002 may update the set of components 914 based on actual histogram data 916 (and/or compressed representation 918 and/or histograms reconstructed based on compressed representation 918). In other examples, processing unit 906 may perform the updating of the set of components 914 based on actual histogram data 916. Processing unit 906 may transmit the updated set of components 914 to processing unit 1002. Alternatively, the set of components 914 may be kept static and not updated based on actual histogram data 916.

While processing unit 1002 is shown as outside of optical measurement system 1000 in FIG. 10, in some examples, processing unit 1002 may be an additional component of optical measurement system 1000.

Figure 11:
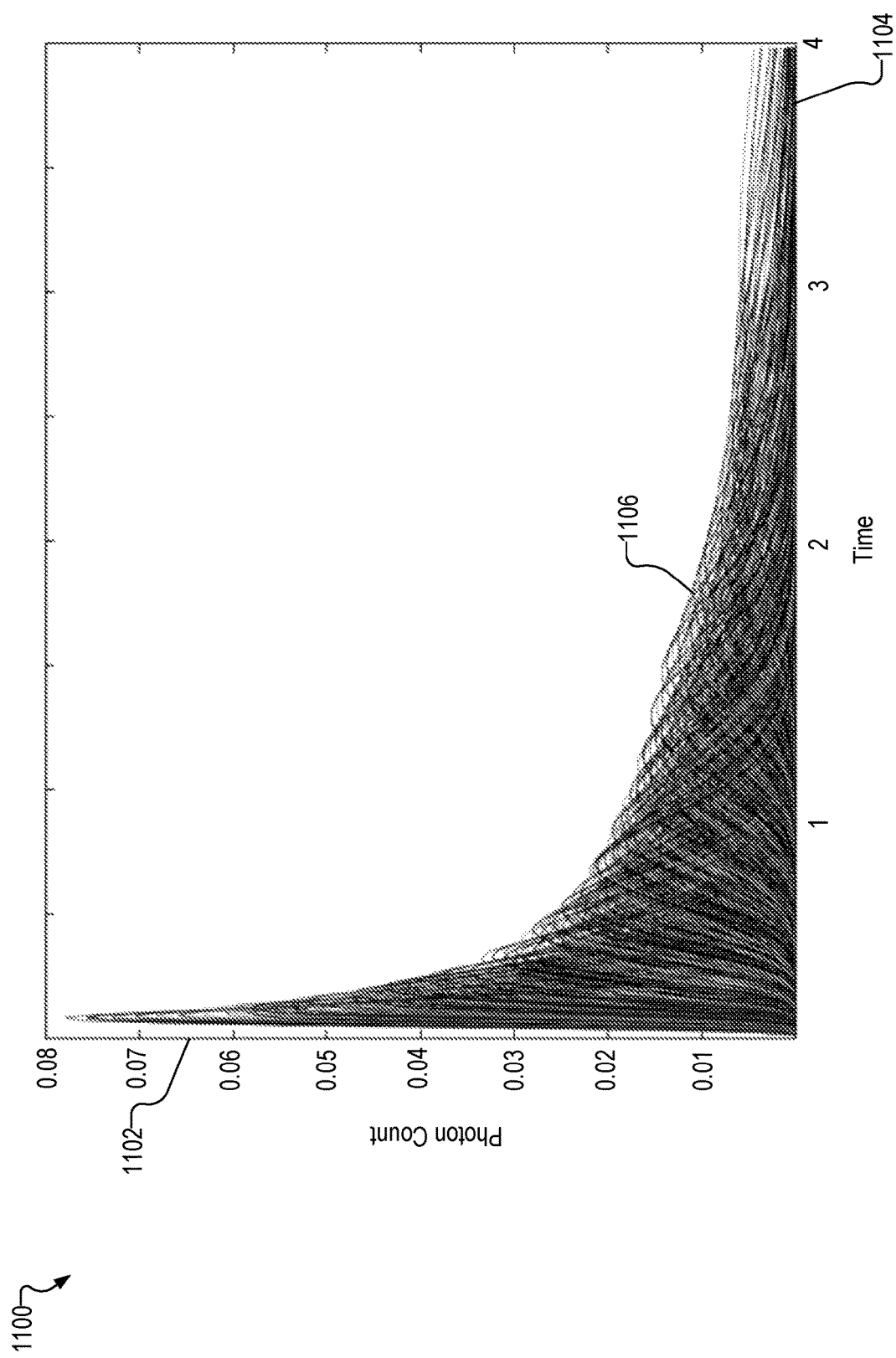
FIG. 11 shows an exemplary graph of simulated histogram data.

FIG. 11 shows an exemplary graph 1100 of simulated histogram data (e.g., simulated histogram data 912). For example, simulated histogram data 912 may be generated based on a model (e.g., model 908) implemented including a semi-infinite model of a time resolved diffusion equation. Parameters (e.g., parameters 910) for such a model 908 may include characteristics such as an attenuation coefficient of the simulated target, an absorption coefficient of the simulated target, a scattering coefficient of the simulated target, a distance between a light source and a photodetector, a length of pulses of light directed at the simulated target, a total time that the light pulses are directed at the simulated target, a length of each time gate for measurements, etc.

A processing unit (e.g., processing unit 906 or processing unit 1002) may generate simulated histogram data 912 using model 908 with a plurality of values for one or more of the plurality of parameters 910. As one example, processing unit 1002 may simulate data using various absorption coefficients (e.g., 0.005 to 0.04 millimeters$^{-1}$ (mm$^{-1}$) in steps of 0.001 mm$^{-1}$), scattering coefficients (e.g., 0.5 to 3 mm$^{-1}$ in steps of 0.01 mm$^{-1}$), and source-photodetector distances (e.g., 10 to 50 mm in steps of 10 mm). The total time in this example may be 4 nanoseconds (ns), with a time gate of 10 picoseconds (ps). While these values may be one example, any suitable values for any suitable parameters 910 may be used to generate simulated histogram data 912.

Using these values, simulated histogram data 912 may include 45,180 measurements for 400 points in time, depicted in graph 1100. Graph 1100 shows a photon count on a y-axis 1102 against time in seconds on an x-axis 1104. Curves 1106 show the set of possible histograms that constitute simulated histogram data 912.

Simulated histogram data 912 may be processed to determine a set of components (e.g., set of components 914) that represent simulated histogram data 912. The set of components 914 may be determined in any suitable manner. For instance, machine learning algorithms may be applied to simulated histogram data 912 to reduce simulated histogram data 912 into the set of components 914. For example, processing unit 1002 may apply a principal component analysis (PCA) algorithm to simulated histogram data 912 to determine a set of eigenvectors that may be linearly combined to represent the histograms of simulated histogram data 912.

Figure 12B:
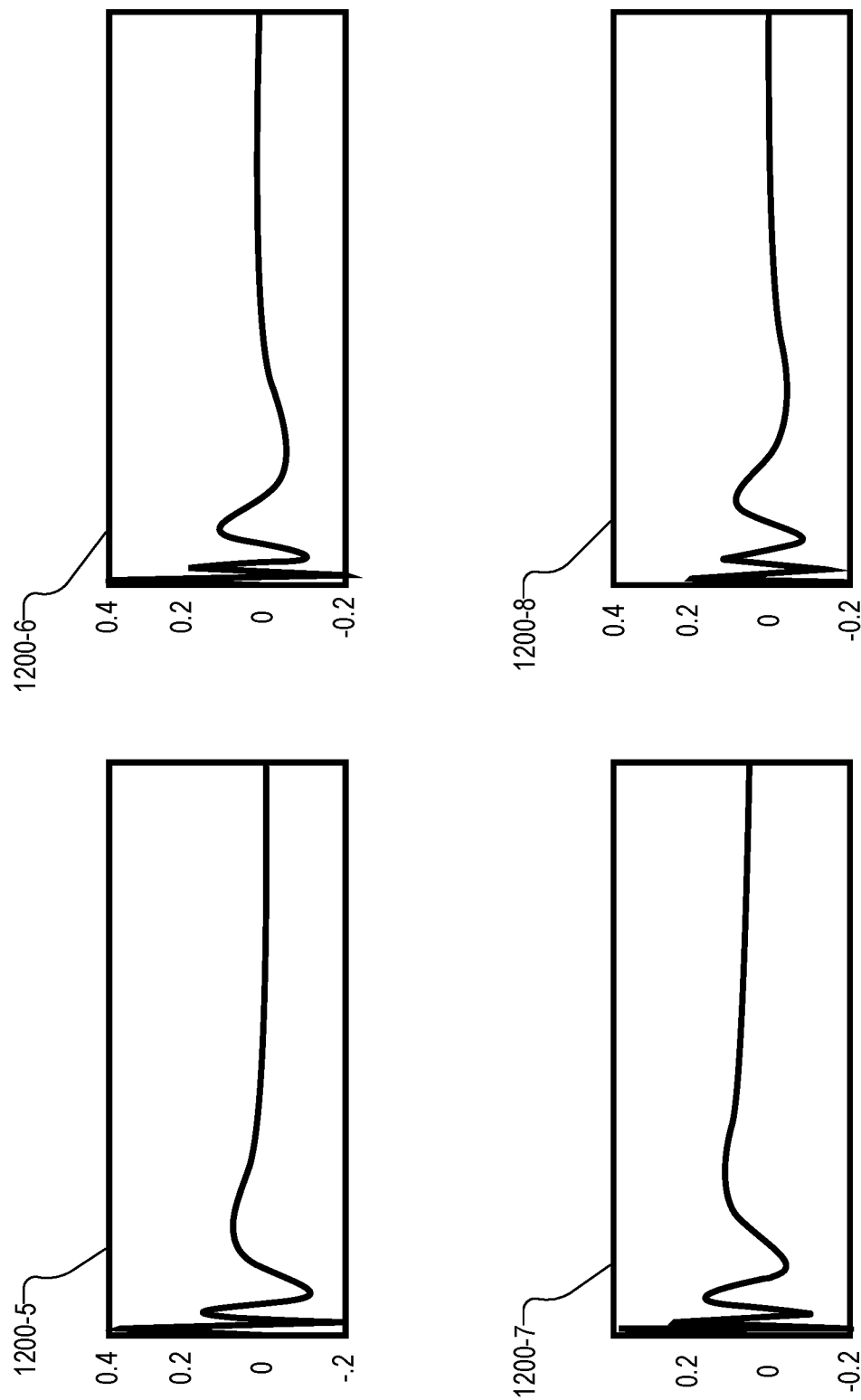
Figure 12C:
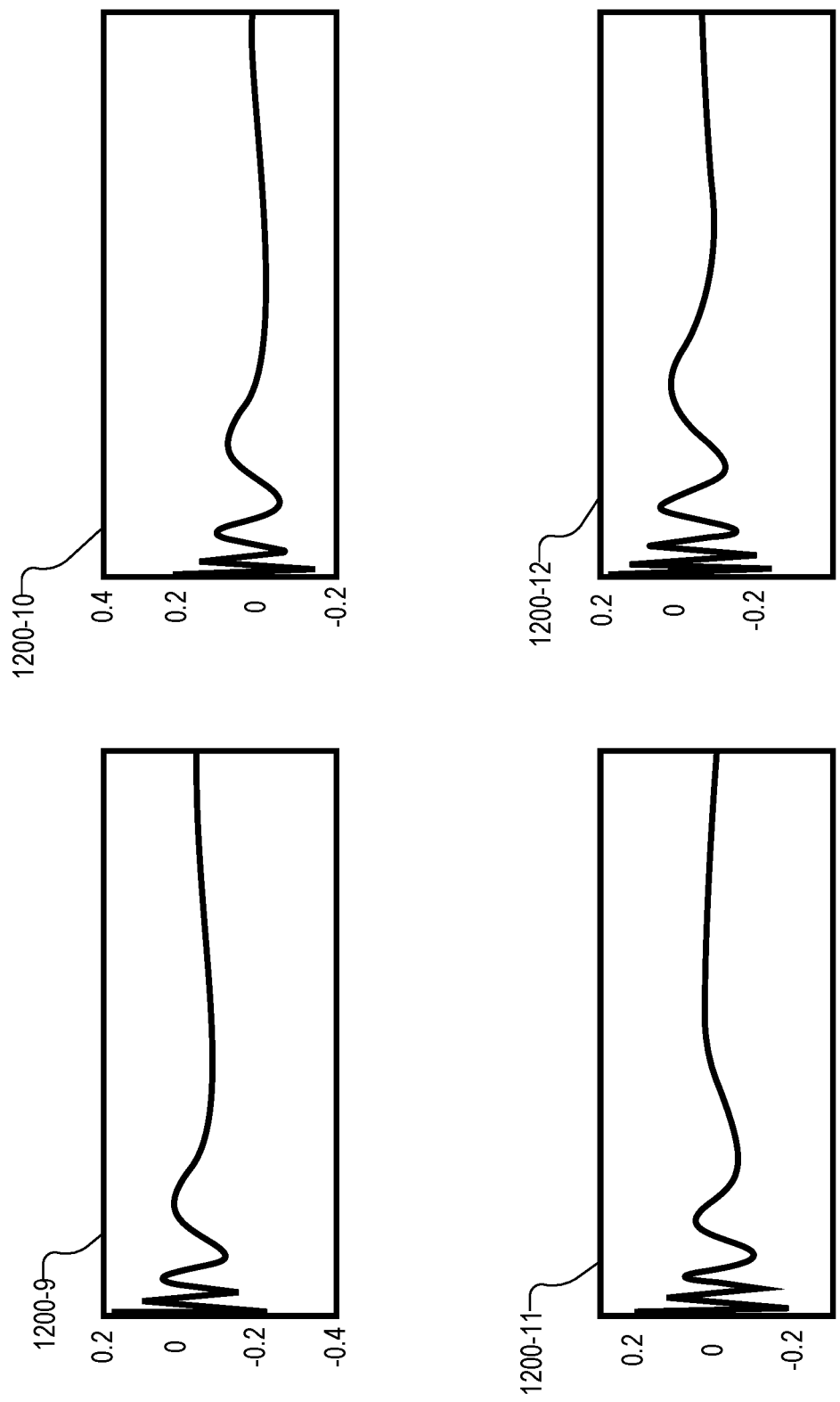
Figure 12D:
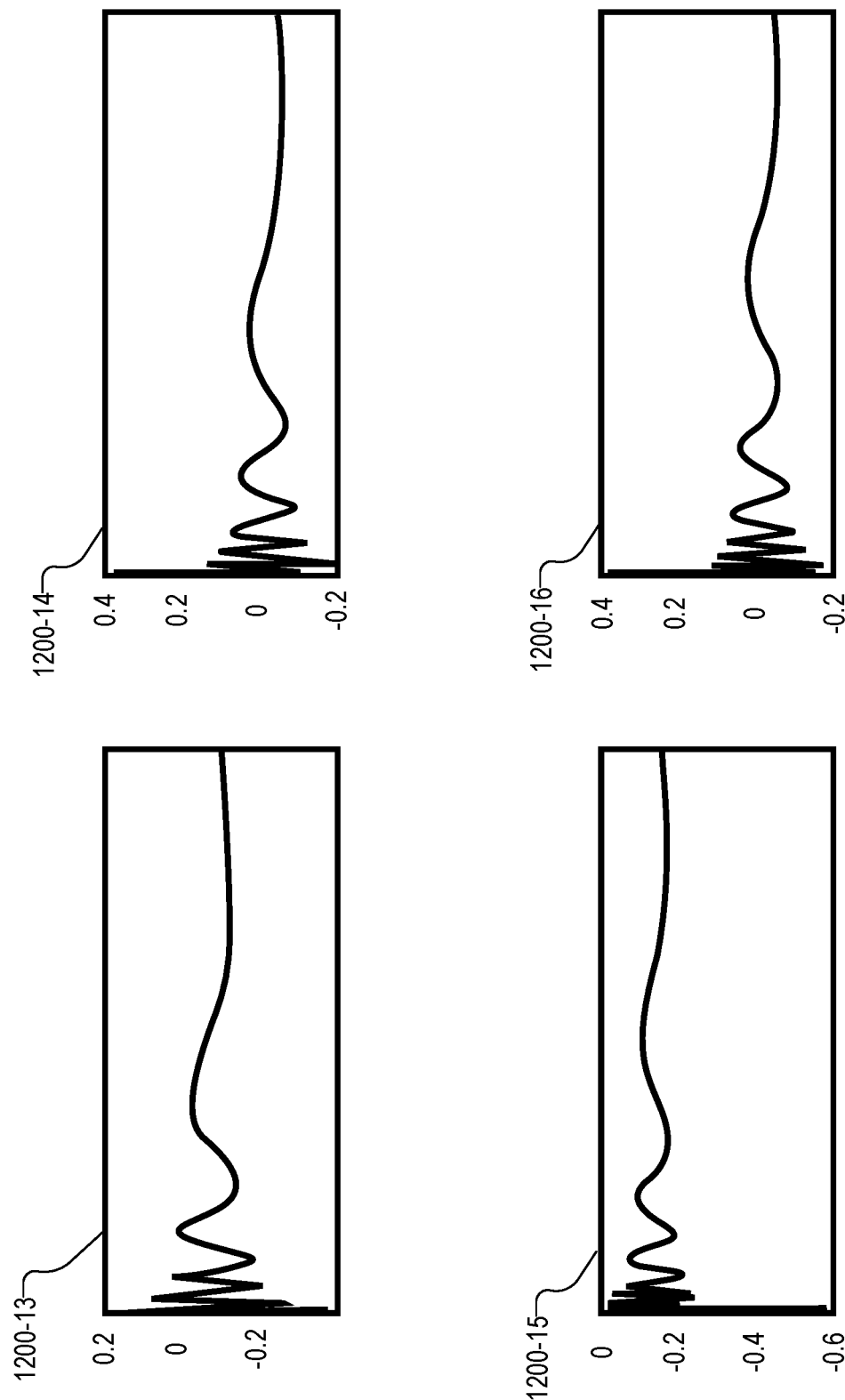

FIGS. 12A-12D show an exemplary set of eigenvectors 1200 that may be an implementation of the set of components 914 for simulated histogram data 912 as shown in FIG. 11. FIG. 12A shows a first four eigenvectors (e.g., eigenvectors 1200-1 through 1200-4), FIG. 12B shows a second four eigenvectors (e.g., eigenvectors 1200-5 through 1200-8), FIG. 12C shows a third four eigenvectors (e.g., eigenvectors 1200-9 through 1200-12), and FIG. 12D shows a fourth four eigenvectors (e.g., eigenvectors 1200-13 through 1200-16). The set of eigenvectors 1200 shown include a subset (e.g., a first 16) of eigenvectors as determined using PCA on a mean-subtracted normalized data set of simulated histogram data 912. Thus, the set of eigenvectors 1200 may be used to represent the set of possible histograms shown in simulated histogram data 912. For instance, each histogram may be represented by a particular linear combination of eigenvectors 1200. For each histogram, a set of weights may be determined that specify the linear combination of eigenvectors 1200 that represent the histogram:

$$w_k = TPSF_k \times V,$$

where w is the weights, TPSF is the histogram, k is the k$^{th}$ histogram (of the set of possible histograms in simulated histogram data 912), and V is the set of eigenvectors 1200. As a result, given the set of eigenvectors 1200, each histogram may be represented by w rather than the data points for each point in time. As the number of weights of w may be less than the number of data points, representing the histograms using w (and based on the set of eigenvectors 1200) may result in a reduction in dimensionality. In this example, the number of data points is 400 for each histogram, while the number of weights for an accurate reconstruction of the histogram may be 20 (or any other suitable number).

While the example shown in FIGS. 11 and 12A-12D describe histograms generated based on arrival times of photons at photodetectors after being scattered by a target, the systems and methods described herein may be used in a variety of suitable applications. For instance, the systems and methods may also be applied for compressing data for tomographic image reconstruction. For example, for a 2D tomographic image reconstruction, a model may include a simulation of a homogenous semi-infinite slab with a plurality of values for parameters such as source-detector distances, absorption coefficient, scattering coefficient, total time, and time gates. Using a plurality of values, simulated data of a set of possible tomographic images may be generated. Based on the set of possible tomographic images, a set of components may be determined, which may include pre-processing such as calculating a time resolved Jacobian for each source-detector pair. The set of components may include a set of sensitivity maps (e.g., banana functions). Such sensitivity maps may be linearly combined to represent the set of possible tomographic images.

As described, the number of sensitivity maps may be fewer than the number of data points for each tomographic image, allowing for a compressed representation of actual tomographic images generated based on a physical target to be stored, transmitted, and/or processed with a reduced dimensionality and minimal loss of information.

Figure 13:
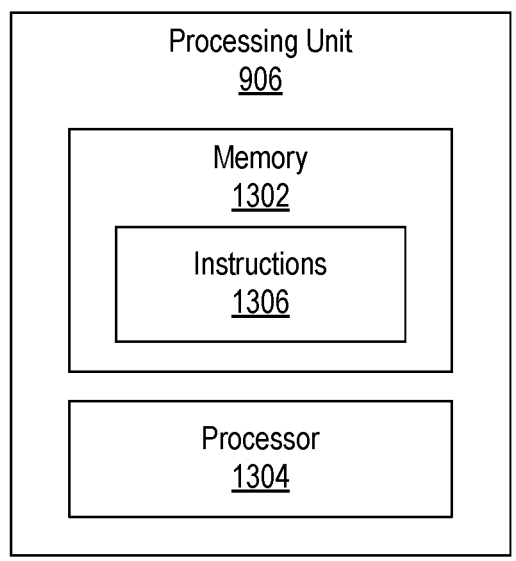
FIG. 13 illustrates an exemplary implementation of a processing unit.

FIG. 13 illustrates an exemplary implementation of processing unit 906 in which processing unit 906 includes a memory 1302 and a processor 1304 configured to be selectively and communicatively coupled to one another. Processing unit 1002 may be similarly implemented. In some examples, memory 1302 and processor 1304 may be distributed between multiple devices and/or multiple locations as may serve a particular implementation.

Memory 1302 may be implemented by any suitable non-transitory computer-readable medium and/or non-transitory processor-readable medium, such as any combination of non-volatile storage media and/or volatile storage media. Exemplary non-volatile storage media include, but are not limited to, read-only memory, flash memory, a solid-state drive, a magnetic storage device (e.g., a hard drive), ferroelectric random-access memory ("RAM"), and an optical disc. Exemplary volatile storage media include, but are not limited to, RAM (e.g., dynamic RAM).

Memory 1302 may maintain (e.g., store) executable data used by processor 1304 to perform one or more of the operations described herein. For example, memory 1302 may store instructions 1306 that may be executed by processor 1304 to perform any of the operations described herein. Instructions 1306 may be implemented by any suitable application, program (e.g., sound processing program), software, code, and/or other executable data instance. Memory 1302 may also maintain any data received, generated, managed, used, and/or transmitted by processor 1304.

Processor 1304 may be configured to perform (e.g., execute instructions 1306 stored in memory 1302 to perform) various operations described herein. For example, processor 1304 may be configured to perform any of the operations described herein as being performed by processing unit 906.

In some examples, processing unit 906 may be included in the same wearable system (e.g., a head-mountable component) that includes photodetectors 902 and TDCs 904. Alternatively, processing unit 906 is not included in the same wearable system that includes photodetectors 902 and TDCs 904.

To illustrate, processing unit 906 may be included in a wearable device separate from a head-mountable component that includes photodetectors 902 and TDCs 904. For example, processing unit 906 may be included in a wearable device configured to be worn off the head while the head-mountable component is worn on the head. In these examples, one or more communication interfaces (e.g., cables, wireless interfaces, etc.) may be used to facilitate communication between the head-mountable component and the separate wearable device.

Additionally or alternatively, processing unit 906 may be remote from the user (i.e., not worn by the user). For example, processing unit 906 may be implemented by a stand-alone computing device communicatively coupled the head-mountable component by way of one or more communication interfaces (e.g., cables, wireless interfaces, etc.).

FIGS. 14-19 illustrate embodiments of a wearable device 1400 that includes elements of the optical detection systems described herein. In particular, the wearable devices 1400 shown in FIGS. 14-19 include a plurality of modules 1402, similar to the modules described herein. For example, each module 1402 may include a light source (e.g., light source 704-1) and a plurality of detectors (e.g., detectors 706-1 through 706-6). The wearable devices 1400 may each also include a controller (e.g., controller 112) and a processor (e.g., processor 108) and/or be communicatively connected to a controller and processor. In general, wearable device 1400 may be implemented by any suitable headgear and/or clothing article configured to be worn by a user. The headgear and/or clothing article may include batteries, cables, and/or other peripherals for the components of the optical measurement systems described herein.

Figure 14:
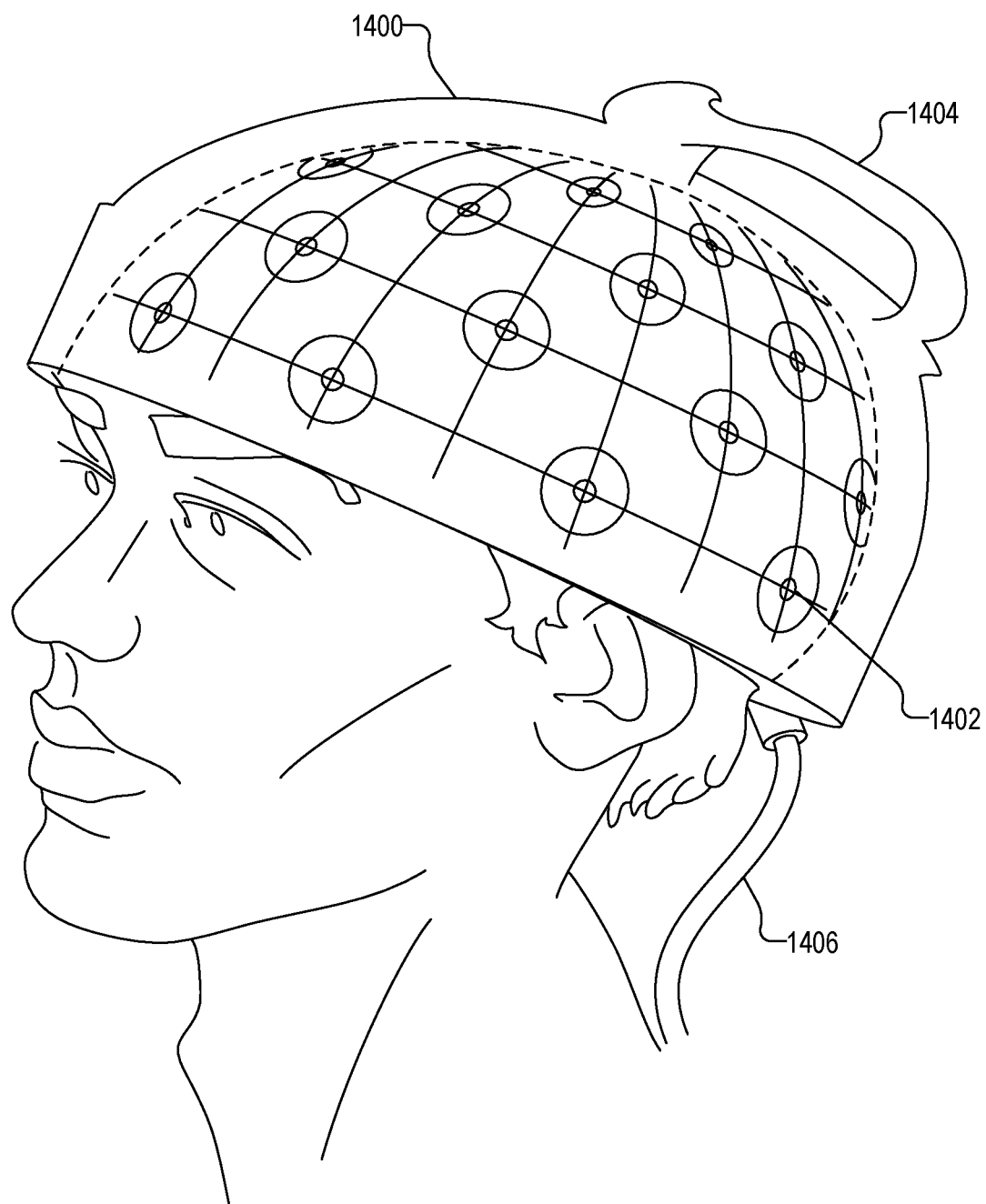
FIGS. 14-19 illustrate embodiments of a wearable device that includes elements of the optical detection systems described herein.
Figure 15:
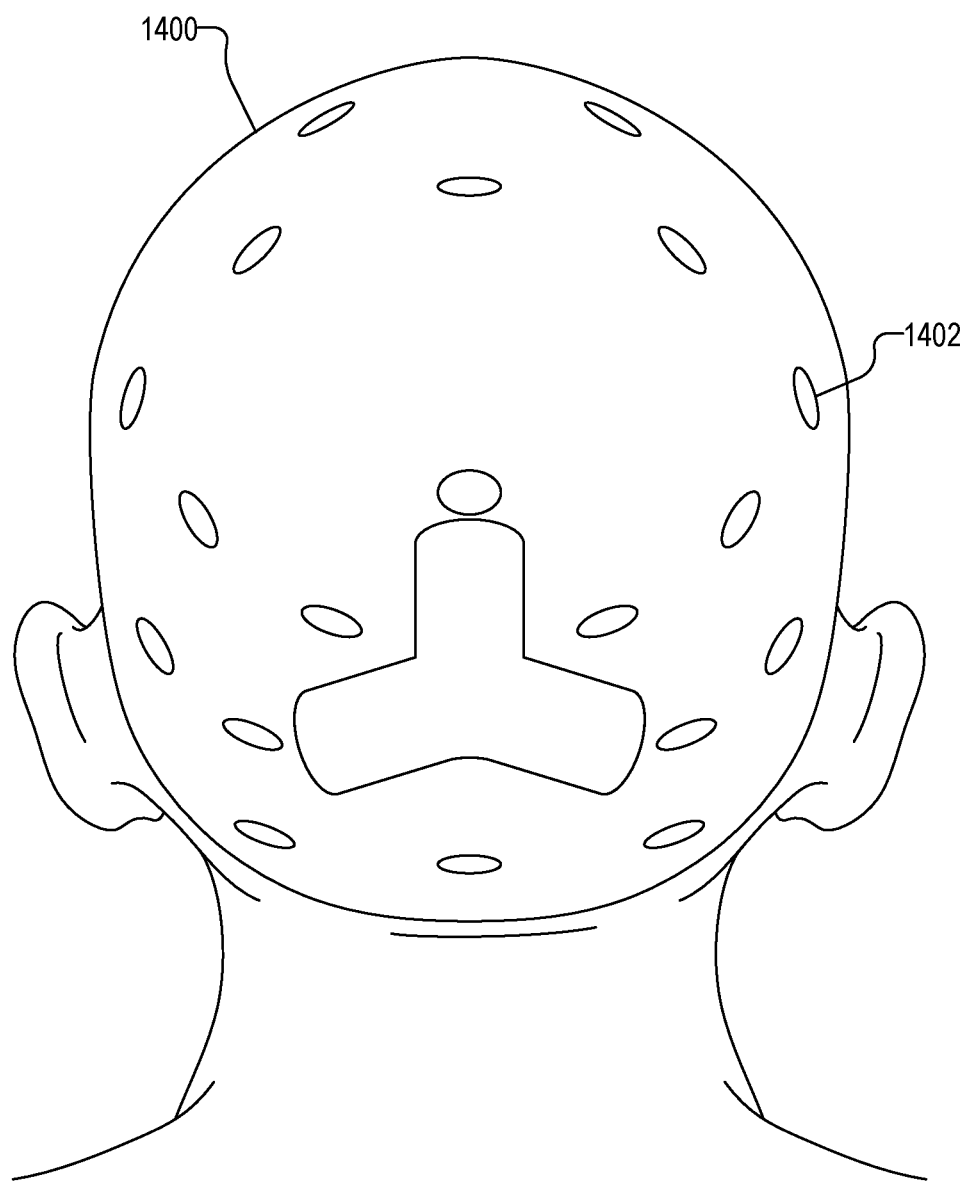
Figure 16:
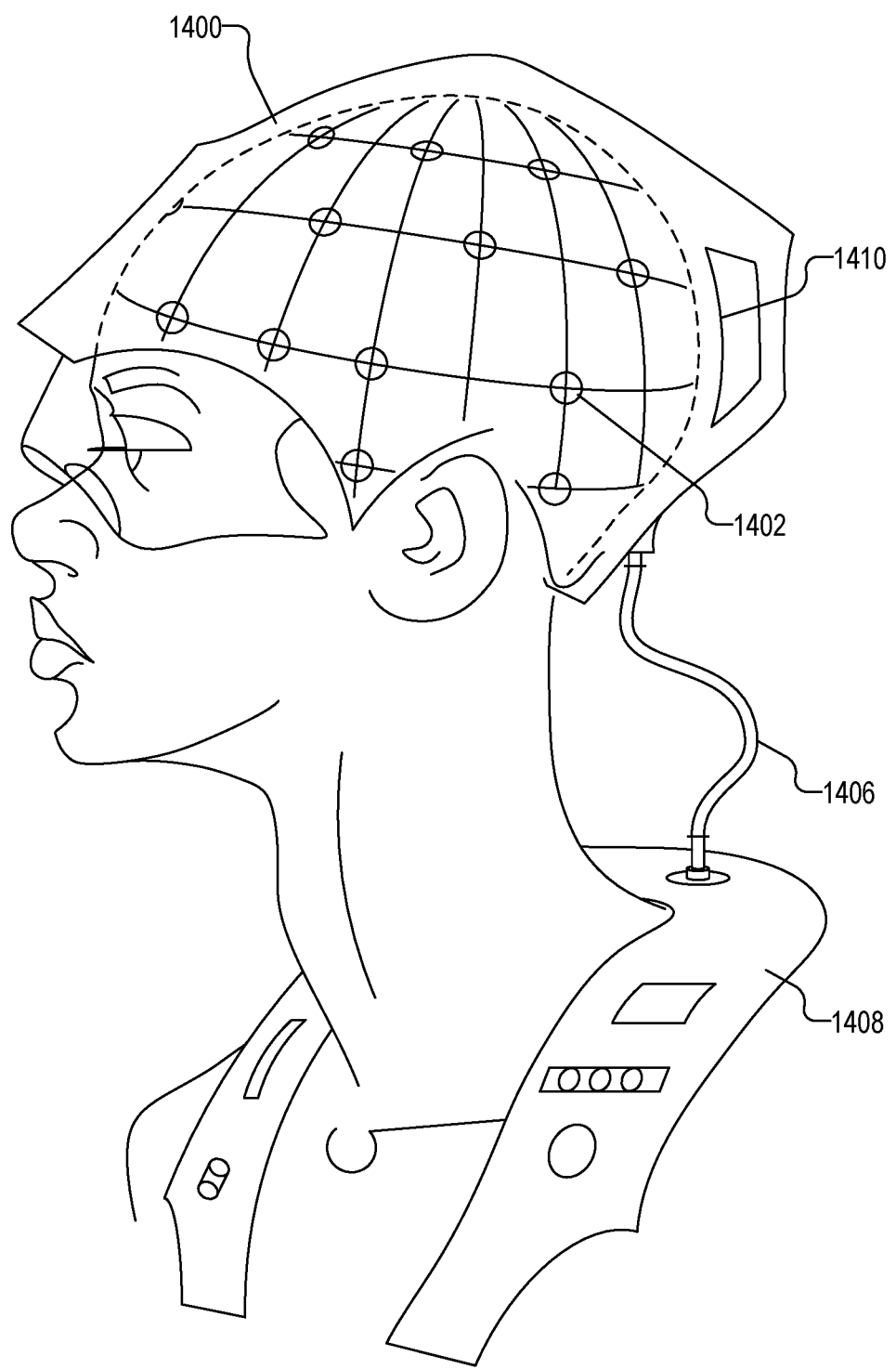

FIG. 14 illustrates an embodiment of a wearable device 1400 in the form of a helmet with a handle 1404. A cable 1406 extends from the wearable device 1400 for attachment to a battery or hub (with components such as a processor or the like). FIG. 15 illustrates another embodiment of a wearable device 1400 in the form of a helmet showing a back view. FIG. 16 illustrates a third embodiment of a wearable device 1400 in the form of a helmet with the cable 1406 leading to a wearable garment 1408 (such as a vest or partial vest) that can include a battery or a hub. Alternatively or additionally, the wearable device 1400 can include a crest 1410 or other protrusion for placement of the hub or battery.

Figure 17:
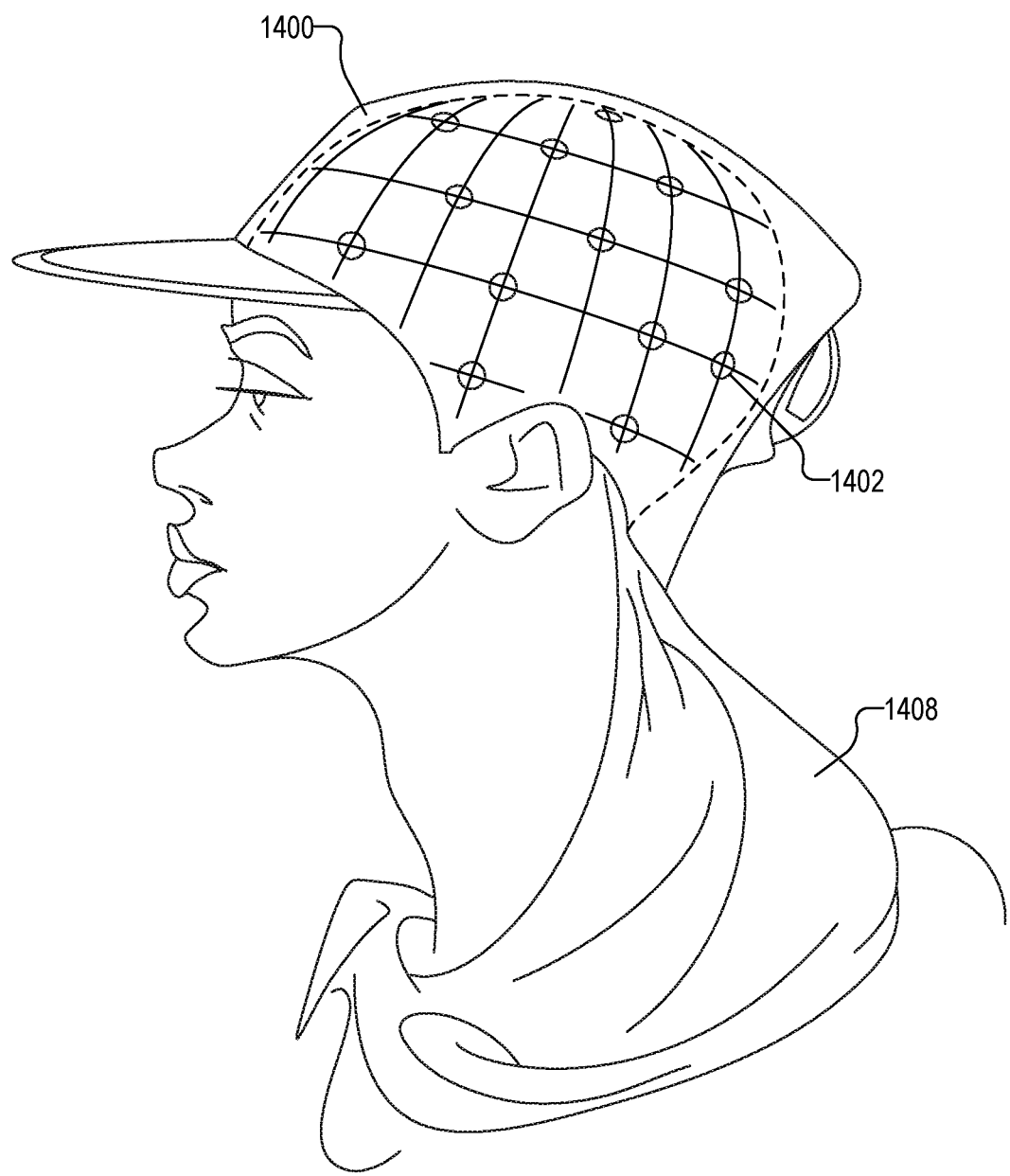
Figure 18:
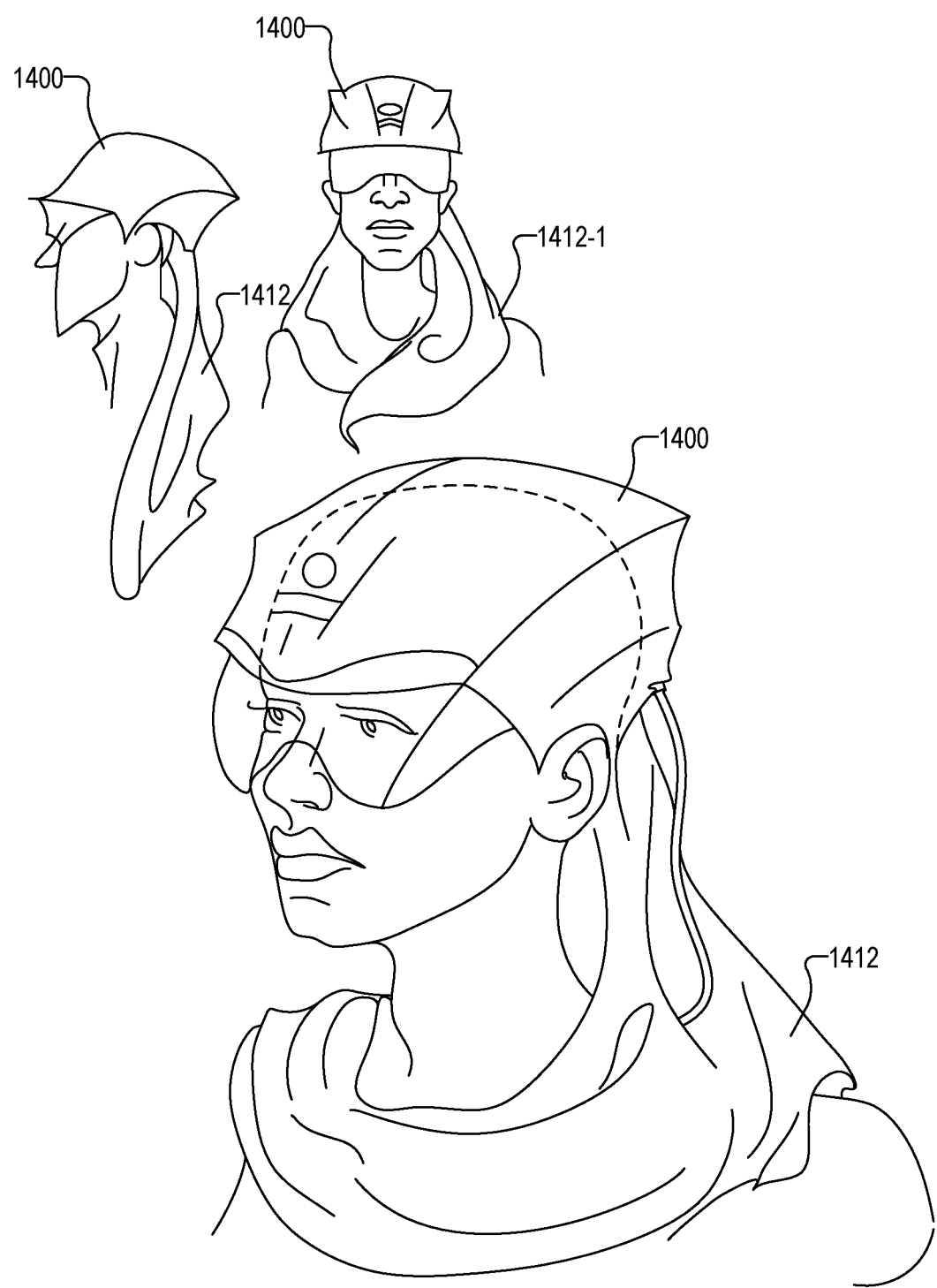
Figure 19:
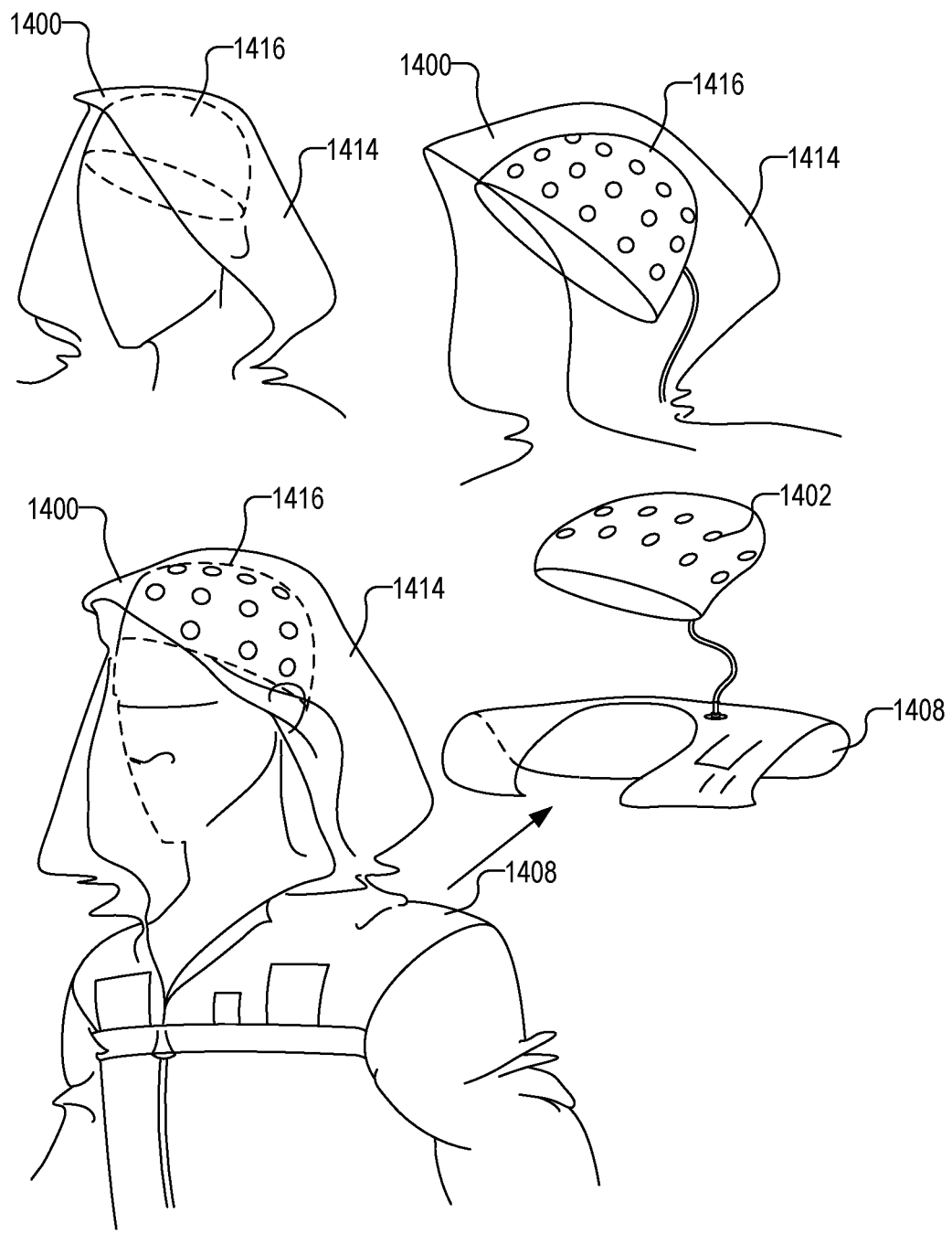

FIG. 17 illustrates another embodiment of a wearable device 1400 in the form of a cap with a wearable garment 1408 in the form of a scarf that may contain or conceal a cable, battery, and/or hub. FIG. 18 illustrates additional embodiments of a wearable device 1400 in the form of a helmet with a one-piece scarf 1412 or two-piece scarf 1412-1. FIG. 19 illustrates an embodiment of a wearable device 1400 that includes a hood 1414 and a beanie 1416 which contains the modules 1402, as well as a wearable garment 1408 that may contain a battery or hub.

Figure 20:
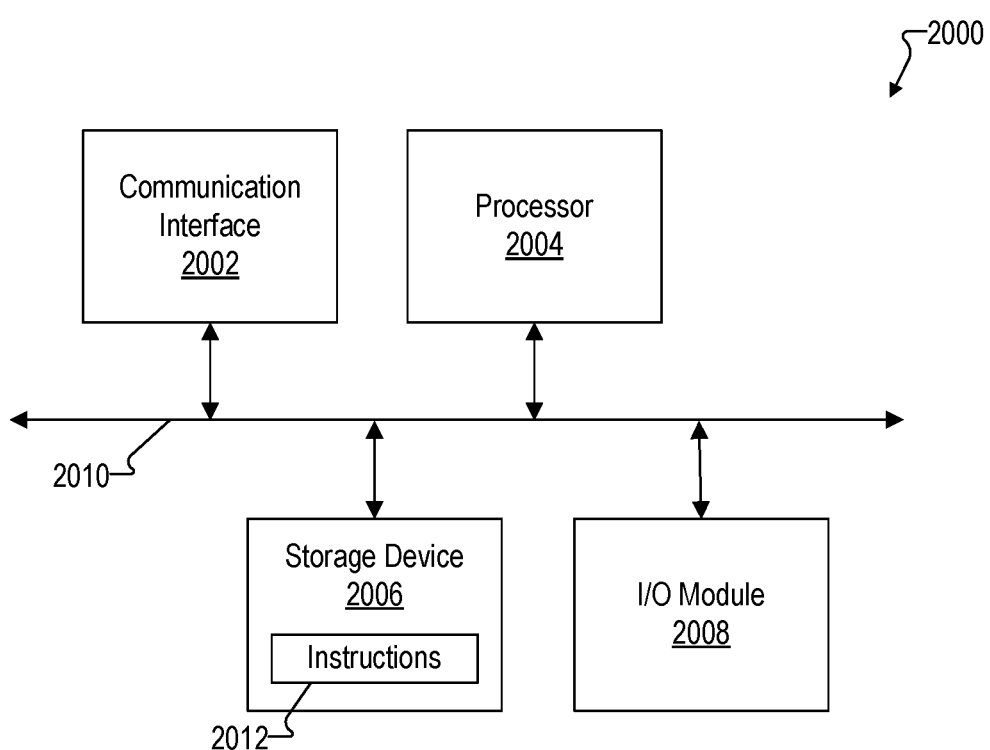
FIG. 20 illustrates an exemplary computing device.

FIG. 20 illustrates an exemplary computing device 2000 that may be specifically configured to perform one or more of the processes described herein. Any of the systems, units, computing devices, and/or other components described herein may be implemented by computing device 2000.

As shown in FIG. 20, computing device 2000 may include a communication interface 2002, a processor 2004, a storage device 2006, and an input/output ("I/O") module 2008 communicatively connected one to another via a communication infrastructure 2010. While an exemplary computing device 2000 is shown in FIG. 20, the components illustrated in FIG. 20 are not intended to be limiting. Additional or alternative components may be used in other embodiments. Components of computing device 2000 shown in FIG. 20 will now be described in additional detail.

Communication interface 2002 may be configured to communicate with one or more computing devices. Examples of communication interface 2002 include, without limitation, a wired network interface (such as a network interface card), a wireless network interface (such as a wireless network interface card), a modem, an audio/video connection, and any other suitable interface.

Processor 2004 generally represents any type or form of processing unit capable of processing data and/or interpreting, executing, and/or directing execution of one or more of the instructions, processes, and/or operations described herein. Processor 2004 may perform operations by executing computer-executable instructions 2012 (e.g., an application, software, code, and/or other executable data instance) stored in storage device 2006.

Storage device 2006 may include one or more data storage media, devices, or configurations and may employ any type, form, and combination of data storage media and/or device as described herein. Electronic data, including data described herein, may be temporarily and/or permanently stored in storage device 2006. For example, data representative of computer-executable instructions 2012 configured to direct processor 2004 to perform any of the operations described herein may be stored within storage device 2006. In some examples, data may be arranged in one or more databases residing within storage device 2006.

I/O module 2008 may include one or more I/O modules configured to receive user input and provide user output. I/O module 2008 may include any hardware, firmware, software, or combination thereof supportive of input and output capabilities. For example, I/O module 2008 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 2008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 2008 is configured to provide graphical data to a display for presentation to a user. The graphical data may be representative of one or more graphical user interfaces and/or any other graphical content as may serve a particular implementation.

Figure 21:
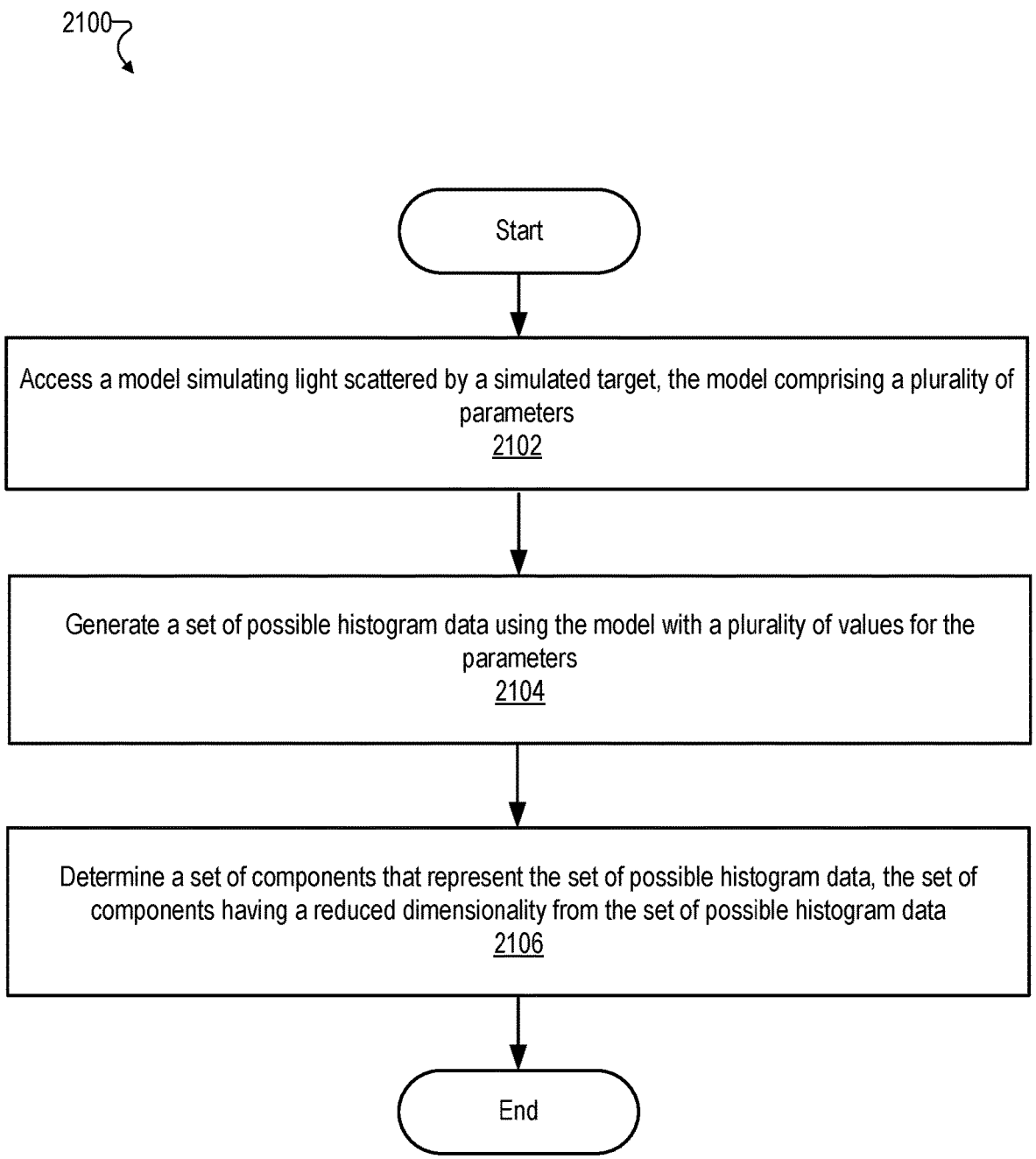
FIGS. 21-22 illustrates exemplary methods.

FIG. 21 illustrates an exemplary method 2100 that may be performed by processing unit 1002 and/or any implementation thereof. While FIG. 21 illustrates exemplary operations according to one embodiment, other embodiments may omit, add to, reorder, and/or modify any of the operations shown in FIG. 21. Each of the operations shown in FIG. 21 may be performed in any of the ways described herein.

At operation 2102, a processing unit accesses a model simulating light scattered by a simulated target, the model comprising a plurality of parameters.

At operation 2104, the processing unit generates a set of possible histogram data using the model with a plurality of values for the parameters.

At operation 2106, the processing unit determines a set of components that represent the set of possible histogram data, the set of components having a reduced dimensionality from the set of possible histogram data.

Figure 22:
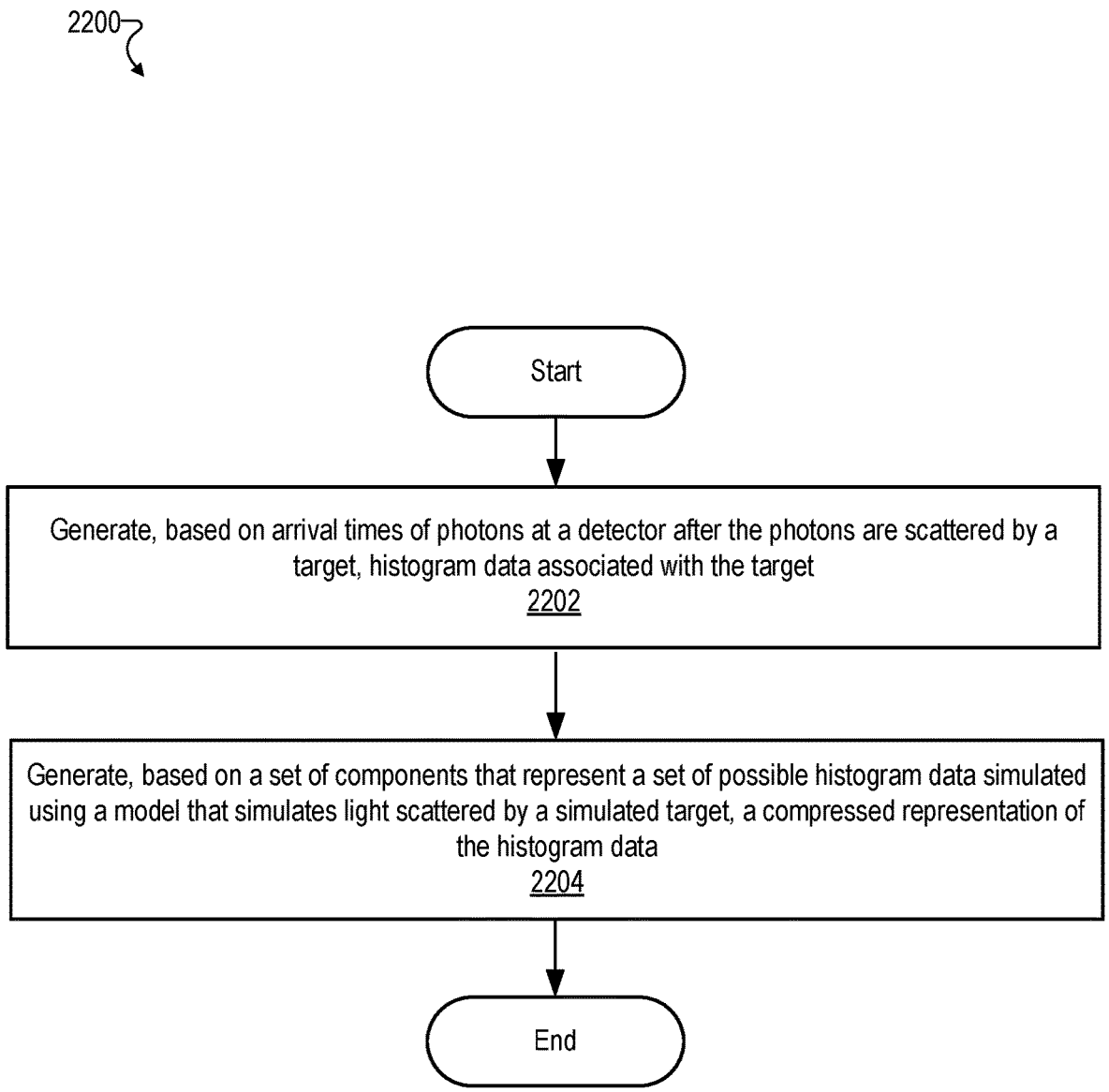

FIG. 22 illustrates an exemplary method 2200 that may be performed by processing unit 906 and/or any implementation thereof. While FIG. 22 illustrates exemplary operations according to one embodiment, other embodiments may omit, add to, reorder, and/or modify any of the operations shown in FIG. 22. Each of the operations shown in FIG. 22 may be performed in any of the ways described herein.

At operation 2202, a processing unit of an optical measurement system generates, based on arrival times of photons at a detector after the photons are scattered by a target, histogram data associated with the target.

At operation 2204, the processing unit generates, based on a set of components that represent a set of possible histogram data simulated using a model that simulates light scattered by a simulated target, a compressed representation of the histogram data.

An illustrative method includes accessing, by a computing device, a model simulating light scattered by a simulated target, the model comprising a plurality of parameters. The method further includes generating, by the computing device, a set of possible histogram data using the model with a plurality of values for the parameters. The method further includes determining, by the computing device, a set of components that represent the set of possible histogram data, the set of components having a reduced dimensionality from the set of possible histogram data.

An illustrative optical measurement system includes a detector configured to detect arrival times for photons scattered by a target. The optical measurement system further includes a processing unit configured to generate, based on the arrival times, histogram data associated with the target. The processing unit is further configured to generate, based on a set of components that represent a set of possible histogram data simulated using a model that simulates light scattered by a simulated target, a compressed representation of the histogram data.

Another illustrative method includes generating, by a processing unit and based on arrival times of photons at a detector after the photons are scattered by a target, histogram data associated with the target. The method further includes generating, by the processing unit and based on a set of components that represent a set of possible histogram data simulated using a model that simulates light scattered by a simulated target, a compressed representation of the histogram data.

Another illustrative optical measurement system includes a head-mountable component configured to be attached to a head of the user, the head-mountable component comprising an array of photodetectors configured to detect photons of light after the light reflects off a target within the head. The optical measurement system further includes a processing unit configured to generate, based on arrival times of the photons at the photodetectors, histogram data associated with the target. The processing unit is further configured to generate, based on a set of components that represent a set of possible histogram data simulated using a model that simulates light scattered by a simulated target, a compressed representation of the histogram data.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. An optical measurement system comprising:
    a detector configured to detect arrival times for photons scattered by a target; and
    a processing unit configured to:
        generate, based on the arrival times, histogram data associated with the target; and
        generate, based on a set of components that represent a set of possible histogram data simulated using a model that simulates light scattered by a simulated target, a compressed representation of the histogram data.

2. The optical measurement system of claim 1, wherein the generating the compressed representation comprises determining a set of weights that define a linear combination of the set of components to represent the histogram data.

3. The optical measurement system of claim 1, wherein the processing unit is further configured to:
    modify, based on the histogram data, the set of components.

4. The optical measurement system of claim 1, wherein the processing unit is further configured to:
    access the model, the model comprising a plurality of parameters;
    generate the set of possible histogram data using the model with a plurality of values for the parameters; and
    determine the set of components that represent the set of possible histogram data, the set of components having a reduced dimensionality from the set of possible histogram data.

5. The optical measurement system of claim 4, wherein the plurality of parameters comprises at least one of an absorption coefficient or a scattering coefficient of the simulated target.

6. The optical measurement system of claim 4, wherein:
    the model comprises a modeled light source and a modeled detector for detecting the simulated light scattered by the simulated target; and the plurality of parameters comprises a parameter representative of a distance between the modeled light source and the modeled detector.

7. The optical measurement system of claim 4, wherein the determining the set of components comprises:
normalizing the set of possible histogram data to generate a normalized data set;
determining a covariance of the normalized data set; and
determining the set of components based on the covariance.

8. The optical measurement system of claim 4, wherein the components comprise eigenvectors determined using principal component analysis (PCA).

9. The optical measurement system of claim 8, wherein the set of components comprises a subset of the eigenvectors.

10. A method comprising:
generating, by a processing unit and based on arrival times of photons at a detector after the photons are scattered by a target, histogram data associated with the target; and
generating, by the processing unit and based on a set of components that represent a set of possible histogram data simulated using a model that simulates light scattered by a simulated target, a compressed representation of the histogram data.

11. The method of claim 10, wherein the generating the compressed representation comprises determining a set of weights that define a linear combination of the set of components to represent the histogram data.

12. The method of claim 10, further comprising modifying, by the processing unit and based on the histogram data, the set of components.

13. A wearable system for use by a user comprising:
a head-mountable component configured to be attached to a head of the user, the head-mountable component comprising an array of photodetectors configured to detect photons of light after the light reflects off a target within the head; and
a processing unit configured to:
generate, based on arrival times of the photons at the photodetectors, histogram data associated with the target; and
generate, based on a set of components that represent a set of possible histogram data simulated using a model that simulates light scattered by a simulated target, a compressed representation of the histogram data.

14. The wearable system of claim 13, wherein the generating the compressed representation comprises determining a set of weights that define a linear combination of the set of components to represent the histogram data.

15. The wearable system of claim 13, wherein the processing unit is further configured to modify, based on the histogram data, the set of components.

* * * * *